United States Patent
Mizuta et al.

(10) Patent No.: US 11,063,313 B2
(45) Date of Patent: Jul. 13, 2021

(54) ADHESIVE FOR PACKAGING MATERIAL, A PACKAGING MATERIAL, AND A CONTAINER

(71) Applicant: DIC Corporation, Tokyo (JP)

(72) Inventors: Seiji Mizuta, Ichihara (JP); Hiroki Kobayashi, Tokyo (JP); Takatoshi Matsuo, Tokyo (JP); Hidemi Nakamura, Tokyo (JP); Takashi Mihara, Ichihara (JP); Tsutomu Kanno, Tokyo (JP); Akio Umino, Ichihara (JP); Hideaki Takei, Ichihara (JP); Tatsuya Kouyama, Tokyo (JP)

(73) Assignee: DIC CORPORATION, Tokyo (JP)

( * ) Notice: Subject to any disclaimer, the term of this patent is extended or adjusted under 35 U.S.C. 154(b) by 147 days.

(21) Appl. No.: 16/469,279

(22) PCT Filed: Dec. 19, 2017

(86) PCT No.: PCT/JP2017/045472
§ 371 (c)(1),
(2) Date: Jun. 13, 2019

(87) PCT Pub. No.: WO2018/117080
PCT Pub. Date: Jun. 28, 2018

(65) Prior Publication Data
US 2020/0106061 A1    Apr. 2, 2020

(30) Foreign Application Priority Data

Dec. 20, 2016  (JP) .............................. JP2016-246567
Dec. 21, 2016  (JP) ................................. 2016-247861
Jun. 29, 2017  (JP) ................................. 2017-127445

(51) Int. Cl.
*H01M 50/124* (2021.01)
*B32B 15/08* (2006.01)
(Continued)

(52) U.S. Cl.
CPC ........... *H01M 50/124* (2021.01); *B32B 15/08* (2013.01); *C08G 18/42* (2013.01); *C08G 63/127* (2013.01);
(Continued)

(58) Field of Classification Search
None
See application file for complete search history.

(56) References Cited

U.S. PATENT DOCUMENTS

2008/0286635 A1   11/2008   Seino et al.
2015/0380695 A1   12/2015   Hanaki et al.

FOREIGN PATENT DOCUMENTS

JP    2008-287971 A    11/2008
JP    2011-102387 A    5/2011
(Continued)

OTHER PUBLICATIONS

Machine Translation of jp2014091770 (Year: 2014).*
(Continued)

*Primary Examiner* — Wyatt P McConnell
(74) *Attorney, Agent, or Firm* — Westerman, Hattori, Daniels & Adrian, LLP

(57) ABSTRACT

The invention provides a packaging material that has high formability and that does not undergo a decrease in the adhesion strength between layers and appearance defects such as lifting between layers even after thermal fusion between portions of the sealant layer performed for sealing battery elements and furthermore after a long-term durability test under high temperature and high humidity. The adhesive for the packaging material including, as essential components, a polyol composition (A) and a polyisocyanate composition (B), wherein the polyol composition (A) includes a polyester polyol made from, as essential materials, a polybasic acid or its derivative and a polyhydric
(Continued)

alcohol, the polybasic acid or its derivative material is all an aromatic-ring-containing polybasic acid or its derivative, and the polyester polyol has a number-average molecular weight in a range of 3000 to 100000; a battery packaging material, a battery container, and a battery that use the adhesive.

12 Claims, 1 Drawing Sheet

(51) Int. Cl.
  *C08G 18/42* (2006.01)
  *C08G 63/127* (2006.01)
  *C09J 175/06* (2006.01)
  *H01M 10/0525* (2010.01)
  *H01M 50/183* (2021.01)

(52) U.S. Cl.
  CPC ....... *C09J 175/06* (2013.01); *H01M 10/0525* (2013.01); *H01M 50/183* (2021.01)

(56) References Cited

FOREIGN PATENT DOCUMENTS

| | | | |
|---|---|---|---|
| JP | 5382256 | B1 | 1/2014 |
| JP | 2014091770 | * | 5/2014 |
| JP | 2014-185317 | A | 10/2014 |
| JP | 2015-82354 | A | 4/2015 |
| WO | 2014/068986 | A1 | 5/2014 |
| WO | 2017/179737 | A1 | 10/2017 |

OTHER PUBLICATIONS

International Search Report dated Jan. 30, 2018, issued in counterpart International Application No. PCT/JP2017/045472 (2 pages).

* cited by examiner

ADHESIVE FOR PACKAGING MATERIAL, A PACKAGING MATERIAL, AND A CONTAINER

TECHNICAL FIELD

The present invention relates to a reactive adhesive used for a packaging material for a container, such as a battery pack or a battery container for a secondary battery such as a lithium-ion battery.

BACKGROUND ART

As electronic devices such as cellular phones and mobile computers become increasingly popular, a demand for batteries of various types such as lithium-ion batteries has been increasing. In such a battery, in order to seal electronic elements such as electrodes and electrolyte, a packaging material is used, which has often been a metal can.

In these years, as storage batteries used for household or mounted on cars such as electric cars and hybrid electric cars, personal computers, cameras, cellular phones, and the like have higher performance, there has been a demand for batteries that have various shapes and also have smaller thickness and smaller weight. However, metal cans having been often employed as the battery packaging material are difficult to follow the trend to various shapes; in addition, there is a limit to the extent of a reduction in the weight, which is disadvantageous. Accordingly, as a battery packaging material that can be easily processed into various shapes, and can achieve a reduction in the thickness and a reduction in the weight, a film-shaped multilayered body has been proposed in which an outer-layer-side substrate layer, an adhesive layer, a metal layer, and a sealant layer are stacked in this order.

The battery packaging material constituted by such a film-shaped multilayered body may be subjected to forming, in order to form a battery container or a battery pack, such that the outer-layer-side substrate layer portion provides a convex surface, and the sealant layer portion provides a concave surface.

In the battery packaging material, the outer-layer-side substrate layer serves as an outer layer, and the sealant layer serves as an inner layer; during assembly of the battery, portions of the sealant layer positioned around the battery elements are thermally fused together to fully enclose the battery elements. As a result, the battery elements are sealed.

In particular, car-mounted or household secondary batteries used for storage of electricity are disposed outdoors. Thus, there has been a demand for such a secondary battery that is operable for many years; and there has been a demand for a packaging material that retains, even in outdoor environments for a long time, adhesion between layers such as a plastic film and a metal foil, and is further free from defects in the appearance.

In order to improve characteristics of such film-shaped battery packaging materials, various studies have been performed with focus on the adhesive layer for bonding the metal layer.

For example, Patent Literature 1 discloses a multilayered packaging material including an inner layer formed of a resin film, a first adhesive layer, a metal layer, a second adhesive layer, and an outer layer formed of a resin film, wherein at least one of the first adhesive layer and the second adhesive layer is formed from an adhesive composition including a resin having side chains having an active hydrogen group, a polyisocyanate, and a polyamine compound, to thereby provide a packaging material that is reliable for deeper forming.

In addition, Patent Literature 2 discloses a battery packaging material having an outer-layer-side resin film layer, an outer-layer-side adhesive layer, a metal foil layer, an inner-layer-side adhesive layer, and a heat seal layer; the outer-layer-side adhesive layer is formed from an adhesive including an acrylic polyol (A) having a number-average molecular weight of 10,000 to 100,000 and a hydroxyl value of 1 to 100 mgKOH/g and an isocyanate curing agent, wherein an equivalent ratio [NCO]/[OH] of isocyanate groups derived from an aromatic polyisocyanate (B) included in the curing agent to hydroxyl groups derived from the acrylic polyol (A) is 10 to 30, to thereby provide a battery packaging material that has high formability, and that does not undergo a decrease in the adhesion strength between layers or appearance defects such as lifting between layers even after a long-term durability test.

In addition, Patent Literature 3 discloses an outer-layer-side adhesive layer that is in the same configuration as in Patent Literature 2, and is formed from an adhesive including an isocyanate curing agent and a polyol component (A) containing 85 to 99 wt % of a polyester polyol (A1) and 1 to 15 wt % of a tri- or higher functional alcohol component (A2), wherein the polyester polyol (A1) is a polyester polyol constituted by a polybasic acid component and a polyhydric alcohol component and having a number-average molecular weight of 5000 to 50000, an aromatic polybasic acid component content relative to 100 mol % of the polybasic acid component is 45 to 95 mol %, and an equivalent ratio [NCO]/([OH]+[COOH]) of isocyanate groups included in the curing agent to the total of hydroxyl groups and carboxyl groups derived from the polyol (A) is 0.5 to 10, to thereby provide a battery packaging material that has high formability, and that does not undergo a decrease in the adhesion strength between layers or appearance defects such as lifting between layers even after a high-temperature high-humidity long-term durability test at 105° C. at 100% RH for 168 hours.

CITATION LIST

Patent Literature

PTL 1: Japanese Unexamined Patent Application Publication No. 2008-287971
PTL 2: Japanese Unexamined Patent Application Publication No. 2014-185317
PTL 3: Japanese Unexamined Patent Application Publication No. 2015-82354

SUMMARY OF INVENTION

Technical Problem

An object of the present invention is to provide a battery packaging material that has high formability and that does not undergo a decrease in the adhesion strength between layers or appearance defects such as lifting between layers even after thermal fusion between portions of the sealant layer performed for sealing battery elements and furthermore after a long-term durability test under high temperature and high humidity, and to provide a reactive battery packaging material adhesive that is used for producing the battery packaging material, and has high formability, high heat resistance, and high wet-heat resistance.

Solution to Problem

The inventors of the present invention have achieved the object by using a battery packaging material adhesive including, as essential components, a polyol composition (A) and a polyisocyanate composition (B), wherein the polyol composition (A) includes a polyester polyol made from, as essential materials, a polybasic acid or its derivative and a polyhydric alcohol, the polybasic acid or its derivative material is all an aromatic-ring-containing polybasic acid or its derivative, and the polyester polyol has a number-average molecular weight in a range of 3000 to 100000.

Thus, the present invention provides a battery packaging material adhesive including, as essential components, a polyol composition (A) and a polyisocyanate composition (B), wherein the polyol composition (A) includes a polyester polyol made from, as essential materials, a polybasic acid or its derivative and a polyhydric alcohol, the polybasic acid or its derivative material is all an aromatic-ring-containing polybasic acid or its derivative, and the polyester polyol has a number-average molecular weight in a range of 3000 to 100000.

In addition, the present invention provides a battery packaging material including at least an outer-layer-side substrate layer 1, an adhesive layer 2, a metal layer 3, and a sealant layer 4 that are stacked in this order, wherein the adhesive layer 2 is a cured product of the above-described battery packaging material adhesive.

In addition, the present invention provides a battery container provided by subjecting the above-described battery packaging material to forming.

In addition, the present invention provides a battery using the above-described battery container.

Advantageous Effects of Invention

Use of a battery packaging material adhesive according to the present invention provides a battery packaging material that has high formability and that does not undergo a decrease in the adhesion strength between layers or appearance defects such as lifting between layers even after thermal fusion between portions of the sealant layer performed for sealing battery elements and furthermore after a long-term durability test under high temperature and high humidity. A battery container using a battery packaging material according to the present invention provides a highly reliable battery.

Figure 1:
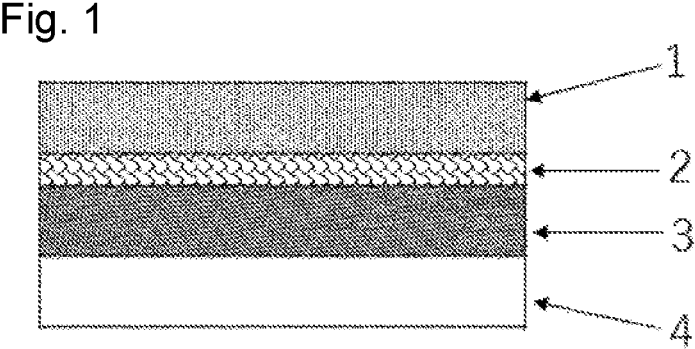
FIG. 1 specifically illustrates a multilayered body according to an embodiment of the present invention, in which an outer-layer-side substrate layer 1, an adhesive layer 2, a metal layer 3, and a sealant layer 4 are stacked in this order.

DESCRIPTION OF EMBODIMENTS (Battery Packaging Material Adhesive)

A battery packaging material adhesive according to the present invention is a battery packaging material adhesive including, as essential components, a polyol composition (A) and a polyisocyanate composition (B).

(Polyol Composition (A): Polyester Polyol)

A polyol composition (A) according to the present invention includes a polyester polyol made from, as essential materials, a polybasic acid or its derivative and a polyhydric alcohol.

A polyester polyol used in the present invention is a polyester polyol made from, as essential materials, a polybasic acid or its derivative and a polyhydric alcohol; the polybasic acid or its derivative material is all an aromatic-ring-containing polybasic acid or its derivative; the polyester polyol has a number-average molecular weight in a range of 3000 to 100000 (hereafter, abbreviated as the polyester polyol (A)). The battery packaging material adhesive includes, as one component, the polyester polyol, to thereby provide both of forming-processability and wet-heat resistance, which enables retention of adhesion for a long time even in outdoor environments.

Specific examples of the aromatic-ring-containing polybasic acid or its derivative used as a material for the polyester polyol (A) in the present invention include orthophthalic acid, terephthalic acid, isophthalic acid, pyromellitic acid, trimellitic acid, 1,4-naphthalenedicarboxylic acid, 2,5-naphthalenedicarboxylic acid, 2,6-naphthalenedicarbozylic acid, naphthalic acid, biphenyldicarboxylic acid, 1,2-bis(phenoxy)ethane-p,p'-dicarboxylic acid, and anhydrides or ester-forming derivatives of these dicarboxylic acids. Specific examples of the carboxylic anhydrides include phthalic anhydride, 2,3-naphthalenedicarboxylic anhydride, trimellitic anhydride, and pyromellitic anhydride. Specific examples of methyl ester compounds of the foregoing include dimethyl terephthalate and dimethyl 2,6-naphthalenedicarboxylate. The acid anhydride used herein means a carboxylic anhydride having two or more carboxyl groups in a single molecule. These may be used alone or in combination of two or more thereof.

In particular, preferred are orthophthalic acid, isophthalic acid, terephthalic acid, trimellitic anhydride, anhydrides of the foregoing, and methyl ester compounds of the foregoing; more preferred are isophthalic acid, terephthalic acid, trimellitic anhydride, anhydrides of the foregoing, and methyl ester compounds of the foregoing.

Examples of the polyhydric alcohol used as a material for the polyester polyol (A) in the present invention include diols and tri- or higher functional polyols.

Examples of the diols include aliphatic diols such as ethylene glycol, diethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl 1,5-pentanediol, neopentyl glycol, 1,6-hexanediol, 1,4-bis (hydroxymethyl)cyclohexane, and 2,2,4-trimethyl-1,3-pentanediol;

ether glycols such as polyoxyethylene glycol, and polyoxypropylene glycol;

modified polyether diols obtained by ring-opening polymerization between such an aliphatic diol and various cyclic ether-bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether;

lactone-based polyester polyols obtained by polycondensation reactions between such an aliphatic diol and various lactones such as lactanoid and ε-caprolactone; bisphenols such as bisphenol A and bisphenol F; and alkylene oxide adducts of bisphenols obtained by adding, to bisphenols such as bisphenol A and bisphenol F, ethylene oxide or propylene oxide, for example.

Examples of the tri- or higher functional polyols include aliphatic polyols such as trimethylolethane, trimethylolpropane, glycerol, hexanetriol, and pentaerythritol;

modified polyether polyols obtained by ring-opening polymerization between such an aliphatic polyol and various cyclic ether-bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether; and lactone-based polyester polyols obtained by polycondensation reactions between such an aliphatic polyol and various lactones such as ε-caprolactone.

In the present invention, in order to improve the appearance of the multilayered body, the polyhydric alcohol included is preferably a branched alkylene diol.

Specifically, the branched alkylene diol is an alkylene diol having in its molecular structure a tertiary carbon atom or a quaternary carbon atom; examples include 1,2,2-trimethyl-1,3-propanediol, 2,2-dimethyl-3-isopropyl-1,3-propanediol, 3-methyl-1,3-butanediol, 3-methyl-1,5-pentanediol, neopentyl glycol, 1,4-bis(hydroxymethyl)cyclohexane, and 2,2,4-trimethyl-1,3-pentanediol; these may be used alone or in combination of two or more thereof. Of these, particularly preferred is neopentyl glycol from the viewpoint of providing the polyester polyol (A) that has high wet-heat resistance.

In the present invention, the polyester polyol (A) may be a polyester polyurethane polyol made from, as essential materials, the polybasic acid or its derivative material that is all an aromatic-ring-containing polybasic acid or its derivative, the polyhydric alcohol, and a polyisocyanate. In this case, examples of the polyisocyanate include diisocyanate compounds and tri- or higher functional polyisocyanate compounds. Such polyisocyanates may be used alone or in combination of two or more thereof.

Examples of the diisocyanate compounds include aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate;

alicyclic diisocyanates such as cyclohexane-1,4-diisocyanate, isophorone diisocyanate, lysine diisocyanate, dicyclohexylmethane-4,4'-diisocyanate, 1,3-bis(isocyanatomethyl)cyclohexane, methylcyclohexane diisocyanate, isopropylidenedicyclohexyl-4,4'-diisocyanate, and norbornane diisocyanate; and aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, and tetramethylxylylene diisocyanate.

Examples of the tri- or higher functional polyisocyanate compounds include adduct-type polyisocyanate compounds intramolecularly having a urethane bond moiety, and nurate-type polyisocyanate compounds intramolecularly having an isocyanurate ring structure.

Such an adduct-type polyisocyanate compound intramolecularly having a urethane bond moiety is obtained by, for example, a reaction between a diisocyanate compound and a polyhydric alcohol. Examples of the diisocyanate compound used in this reaction include various diisocyanate compounds described above as examples of diisocyanate compounds; these may be used alone or in combination of two or more thereof. Examples of the polyol compound used in the reaction include various polyol compounds described as examples of polyhydric alcohols, and polyester polyols obtained by reactions between polyhydric alcohol and polybasic acid; these may be used alone or in combination of two or more thereof.

Such a nurate-type polyisocyanate compound intramolecularly having an isocyanurate ring structure is obtained by, for example, a reaction between a diisocyanate compound and a monoalcohol and/or a diol. Examples of the diisocyanate compound used in this reaction include various diisocyanate compounds described above as examples of diisocyanate compounds; these may be used alone or in combination of two or more thereof. Examples of the monoalcohol used in the reaction include hexanol, 2-ethylhexanol, octanol, n-decanol, n-undecanol, n-dodecanol, n-tridecanol, n-tetradecanol, n-pentadecanol, n-heptadecanol, n-octadecanol, n-nonadecanol, eicosanol, 5-ethyl-2-nonanol, trimethylnonyl alcohol, 2-hezyldecanol, 3,9-diethyl-6-tridecanol, 2-isoheptylisoundecanol, 2-octyldodecanol, and 2-decyltetradecanol. Examples of the diol include the aliphatic diols and the like described above as examples of polyhydric alcohols. The monoalcohols may be used alone or in combination of two or more thereof, and the diols may be used alone or in combination of two or more thereof.

In the polyester polyol (A) used in the present invention, in order to provide higher adhesion strength in adhesive applications and to provide a cured adhesive layer having a crosslinking density suitable for obtaining formability, heat resistance, and wet-heat resistance, the solid-content hydroxyl value is preferably in a range of 1.0 to 40.0 mgKOH/g, more preferably 1.0 to 30.0 mgKOH/g, most preferably in a range of 3.0 to 25.0 mgKOH/g.

In the polyester polyol (A) used in the present invention, in order to provide higher adhesion strength in adhesive applications, the number-average molecular weight (Mn) is preferably in a range of 3000 to 100000, more preferably 3500 to 50000, more preferably 4000 to 20000, more preferably 5000 to 20000. When the number-average molecular weight is less than 3000, the multilayered body may have less good appearance and lower forming-processability.

On the other hand, the weight-average molecular weight (Mw) is preferably in a range of 5000 to 300000, more preferably in a range of 10000 to 200000.

In the present invention, the weight-average molecular weight (Mw) and the number-average molecular weight (Mn) are values measured by gel permeation chromatography (GPC) under the following conditions.

Measurement apparatus: HLC-8320GPC, manufactured by Tosoh Corporation

Columns: TSKgel 4000HXL, TSKgel 3000HXL, TSKgel 2000HXL, and TSKgel 1000HXL, manufactured by Tosoh Corporation Detector: RI (differential refractometer)

Data processing: Multistation GPC-8020 model II, manufactured by Tosoh Corporation Measurement conditions:

Column temperature: 40° C.

Developing solvent: tetrahydrofuran

Flow rate: 0.35 ml/min

Standards: monodisperse polystyrenes

Sample: obtained by filtering 0.2 mass % (in terms of resin solid content) tetrahydrofuran solution through microfilter (100 μl)

In the polyester polyol (A) used in the present invention, the solid-content acid value is not particularly limited, but is preferably 10.0 mgKOH/g or less. The solid-content acid value is preferably 5.0 mgKOH/g or less in order to provide higher wet-heat resistance in adhesive applications. The solid-content acid value is more preferably 2.0 mgKOH/g or less, more preferably 1.8 mgKOH/g or less, most preferably 1.6 mgKOH/g or less. Such a polyester polyol (A) can be obtained by a production method described later. The lower limit of the solid-content acid value is preferably as low as possible. However, from the viewpoint of reactivity, it is difficult to introduce hydroxyl groups to ail ends of the polyester polyol (A), and some ends have carboxyl groups. Thus, the solid-content acid value is substantially 1.0 mgKOH/g or more, or is often 0.5 mgKOH/g or more in the case of production under control such as use of excess of the polyhydric alcohol relative to the aromatic-ring-containing polybasic acid or its derivative.

In the polyester polyol (A) used in the present invention, the glass transition temperature is not particularly limited, but is, in order to suppress oozing out of the adhesive during dry lamination for producing the multilayered body, preferably −30° C. or more, more preferably −20° C. or more, still more preferably −10° C. or more. The glass transition temperature is, in order to suppress tunneling during dry lamination, preferably 80° C. or less, more preferably 70° C. or less, still mere preferably 55° C. or less.

In the present invention, the glass transition temperature is a value measured in the following manner.

A differential scanning calorimeter (DSC-7000, manufactured by SII NanoTechnology Inc.; hereafter, DSC) is used to heat 5 mg of a sample, in a nitrogen stream at 30 mL/min, from room temperature at 10° C./min to 200° C., subsequently to cool the sample at 10° C./min to −80° C. The sample is again heated at 10° C./min to 150° C. The measurement provides a DSC curve; in the measurement result observed at the second temperature rise process, a lower-temperature-side baseline is extended to the higher-temperature side to draw a straight line; a tangential line is drawn at a point of the maximum gradient of the stepped curve of glass transition; the point of intersection of these lines is determined as the point of glass transition, and the temperature of this point is determined as the glass transition temperature. In the first temperature rise, the temperature is increased to 200° C.; however, this temperature is selected so that the polyester polyol (A) sufficiently melts; when 200° C. is not sufficient for melting, the temperature is appropriately adjusted. Similarly, when the cooling temperature of −80° C. is not sufficient (for example, the glass transition temperature is lower), the temperature is appropriately adjusted.

The reason why use of such a polyester polyol (A) provides a reactive battery packaging material adhesive having high formability, high heat resistance, and high wet-heat resistance has not been clarified, but is inferred as follows. The polybasic acid or its derivative material is all an aromatic-ring-containing polybasic acid or its derivative, so that a rigid skeleton is introduced into the polyester polyol; in addition, the polyester polyol has a number-average molecular weight (Mn) in a range of 3000 to 100000, so that the post-reaction adhesive (adhesive layer) has such a high cohesive strength that resists deformation during forming. In addition, the rigid skeleton derived from the aromatic-ring-containing polybasic acid or its derivative inferentially contributes to improvements in heat resistance and wet-heat resistance.

A preferred embodiment of the polyester polyol (A) used in the present invention is a polyester polyol (A) that is a polyester polyol made from, as essential materials, a polybasic acid or its derivative and a polyhydric alcohol, wherein the polybasic acid or its derivative material is all an aromatic-ring-containing dibasic acid or its derivative, and the polyhydric alcohol is all a dihydric alcohol.

Another preferred embodiment of the polyester polyol (A) used in the present invention is a polyester polyol (A) that is a polyester polyurethane polyol made from, as essential materials, a polybasic acid or its derivative, a polyhydric alcohol, and a polyisocyanate, wherein the polybasic acid or its derivative material is all an aromatic-ring-containing dibasic acid or its derivative, the polyhydric alcohol is all a dihydric alcohol, and the polyisocyanate is all a diisocyanate compound.

The polyol composition (A) includes such a linear polyester polyol (A) made from materials that are all bifunctional compounds, to thereby achieve a reduction in the cure shrinkage during formation of a cured coating film by a reaction between the polyol composition (A) and a polyisocyanate composition (B) described later, which results in suppression of strain between substrates. As a result, the battery packaging material adhesive according to the present invention has high adhesion strength.

In addition, the polyol composition (A) includes such a polyester polyol (A) to thereby provide a cured coating film that has improved elongation. Thus, the battery packaging material adhesive according to the present invention has very high forming-processability.

Furthermore, the polyol composition (A) includes such a polyester polyol (A) to thereby have a relatively low viscosity and high coatability, so that it is suitably used as a solvent-free-type adhesive described later or a solvent-type adhesive having high a solid content concentration.

In this Specification, "made from materials that are all bifunctional compounds" means being made from materials that are substantially all bifunctional compounds. For example, consider a case where a material is a dihydric alcohol that is industrially produced and purified but inevitably contains residual monofunctional alcohols and tri- or higher functional polyols; this case provides the above-described linear polyester polyol (A) made from materials that are all bifunctional compounds. The same applies to the dibasic acid or its derivative and the diisocyanate compound.

Another preferred embodiment of the polyester polyol (A) used in the present invention is a polyester polyol (A) that is a polyester polyol made from, as essential materials a polybasic acid or its derivative and a polyhydric alcohol, wherein the polybasic acid or its derivative material is all an aromatic-ring-containing polybasic acid or its derivative the polyhydric alcohol includes a branched alkylene diol, and the content of the branched alkylene diol relative to 100 mol % of the polyhydric alcohol is 5 mol % or more and 95 mol % or less.

Another preferred embodiment of the polyester polyol (A) used in the present invention is a polyester polyol (A) that is a polyester polyurethane polyol made from, as essential materials, a polybasic acid or its derivative, a polyhydric alcohol, and a polyisocyanate, wherein the polybasic acid or its derivative material is all an aromatic-ring-containing polybasic acid or its derivative, the polyhydric alcohol includes a branched alkylene diol, and the content of the branched alkylene diol relative to 100 mol % of the polyhydric alcohol is 5 mol % or more and 95 mol % or less.

The content of the branched alkylene diol is thus set to 5 mol % or more, which further suppresses deterioration of the appearance such as generation of an orange peel pattern on the surface of the adhesive after dry lamination. In order to improve fluidity and wettability for the surfaces of substrates and to ensure an initial adhesion strength, a polyol is preferably used that is less bulky and does not have a tertiary carbon atom or a quaternary carbon atom in the molecular structure. From the viewpoint of providing both of a good appearance and a high initial adhesion strength, the content of the branched alkylene diol is preferably set to 95 mol % or less.

The polyester polyol (A) used in the present invention may satisfy, among the above-described preferred embodiments, a plurality of embodiments.

The reaction of the aromatic-ring-containing polybasic acid or its derivative and the polyhydric alcohol, or the reaction of the aromatic-ring-containing polybasic acid or its derivative, the polyhydric alcohol, and the polyisocyanate may be performed by a publicly known method.

For example, the reaction of the aromatic-ring-containing polybasic acid or its derivative and the polyhydric alcohol may be performed by a publicly known and commonly used polycondensation reaction (or an esterification reaction) using the aromatic-ring-containing polybasic acid or its derivative, the polyhydric alcohol, and a polymerization catalyst. The reaction of the aromatic-ring-containing polybasic acid or its derivative, the polyhydric alcohol, and the polyisocyanate can be performed: the aromatic-ring-containing polybasic acid or its derivative and the polyhydric alcohol are reacted by the above-described method to provide a polyester polyol; the polyester polyol and the polyisocyanate are subjected to a chain extension reaction optionally in the presence of a publicly known and commonly used urethane-forming catalyst, to thereby obtain the polyester polyol (A) according to the present invention.

More specifically, the esterification reaction of the aromatic-ring-containing polybasic acid or its derivative and the polyhydric alcohol is performed in the following manner: the aromatic-ring-containing polybasic acid or its derivative, the polyhydric alcohol, and a polymerization catalyst are charged into a reaction vessel equipped with a stirring device and rectifying equipment, and heated to about 130° C. under stirring at standard atmospheric pressure; subsequently, within the reaction temperature range of 130° C. to 260° C., heating is performed at a rate of 5° C. to 10° C. per hour while generated water is driven off; after the esterification reaction continues for 4 to 12 hours, while the degree of reduction of pressure is increased from the standard atmospheric pressure to a range of 1 to 300 torr, excess polyhydric alcohol is driven off to accelerate the reaction. Thus, the polyester polyol (A) can be produced.

The polymerization catalyst used for the esterification reaction is preferably a polymerization catalyst composed of at least one metal selected from the group consisting of, in the periodic table, group 2, group 4, group 12, group 13, group 14, and group 15, or a compound of such a metal. Examples of the polymerization catalyst composed of such a metal or a metal compound include metals such as Ti, Sn, Zn, Al, Zr, Mg, Hr, and Ge and compounds of these metals, more specifically, titanium tetraisopropoxide, titanium tetrabutoxide, titanium oxyacetylacetonate, tin octanoate, tin 2-ethylhexanoate, zinc acetylacetonate, zirconium tetrachloride, zirconium tetrachloride-tetrahydrofuran complex, hafnium tetrachloride, hafnium tetrachloride-tetrahydrofuran complex, germanium oxide, and tetraethoxygermanium.

Preferred examples of commercially available products of the polymerization catalyst useable for the esterification reaction include ORGATIX TA series, TC series, ZA series, ZC series, and AL series, manufactured by Matsumoto Fine Chemical Co., Ltd.; and organo-tin catalysts, inorganic metal catalysts, and inorganic tin compounds manufactured by Nitto Kasei Co., Ltd.

The amount of such a polymerization catalyst used is not particularly limited as long as the esterification reaction can be controlled and a polyester polyol (A) of a good quality is obtained; for example, the amount is, relative to the total amount of the polybasic acid or its derivative and the polyhydric alcohol, 10 to 1000 ppm, preferably 20 to 300 ppm, more preferably, in order to suppress coloration of the polyester polyol (A), 30 to 500 ppm.

When the polyester polyol (A) used in the present invention is a linear polyester polyol (A), both ends are preferably hydroxyl groups; when the polyester polyol (A) used in the present invention is a polyester polyol (A) having a branched structure, all ends are preferably hydroxyl groups. In order to obtain such a polyester polyol (A), the reaction is performed with an excess amount of the polyhydric alcohol relative to the aromatic-ring-containing polybasic acid or its derivative. The amount of polyhydric alcohol charged relative to 1.0 mole of the aromatic-ring-containing polybasic acid or its derivative may be 1.0 mole (however, excluding 1.0 mole) to 1.4 mole, more preferably 1.0 mole (however, excluding 1.0 mole) to 1.2 mole.

The polyester polyurethane polyol (A) used in the present invention is obtained by subjecting, to chain extension using a polyisocyanate, the polyester polyol (A) obtained by the above-described method. Specifically, the following production method is used: the polyester polyol (A), a polyisocyanate, a chain extension catalyst, and optionally a good solvent for the polyester polyol (A) and the polyisocyanate are charged into a reaction vessel, and stirred at reaction temperatures of 60° C. to 90° C. The reaction is caused to proceed until the isocyanate groups derived from the employed polyisocyanate substantially no longer remain. Thus, the polyester polyurethane polyol (A) used in the present invention is obtained.

The chain extension catalyst employed may be a publicly known and publicly used catalyst that is used as an ordinary urethane-forming catalyst. Specific examples include organo-tin compounds, organo-tin carboxylic acid salts, lead carboxylic acid salts, bismuth carboxylic acid salts, titanium compounds, and zirconium compounds; and these may be used alone or in combination thereof. The amount of the chain extension catalyst used is an amount for causing sufficient acceleration of the reaction of the polyester polyol (A) and the polyisocyanate; specifically, the amount is, relative to the total amount of the polyester polyol (A) and the polyisocyanate, preferably 5.0 mass % or less, more preferably, in order to suppress hydrolysis or coloration of the resin due to the catalyst, 1.0 mass % or less. Furthermore, such a chain extension catalyst may be used in consideration of its activity as a curing catalyst for the polyester polyol (A) and an isocyanate composition (B) described later.

Examples of a method of determining the residual amount of isocyanate groups include a method of performing infrared absorption spectrometry and determining the presence or absence of an absorption peak observed at about 2260 $cm^{-1}$, which is an absorption spectrum derived from isocyanate groups; and a titration method of quantifying isocyanate groups.

Examples of the good solvent used for producing the polyester polyurethane polyol (A) include ethyl acetate, butyl acetate, methyl ethyl ketone, methyl isobutyl ketone, propylene glycol monomethyl ether acetate, toluene, and xylene. These may be used alone or in combination of two or more thereof.

For the polyester polyol (A) used in the present invention, other reaction materials may be additionally used as long as advantages of the present invention are not degraded.

(Polyisocyanate Composition (B))

The polyisocyanate composition (B) used in the present invention includes an isocyanate compound (hereafter, referred to as the isocyanate compound (B) in the present invention). The isocyanate compound (B) is not particularly limited as long as it is a compound having an isocyanate group in a single molecule, and may be selected from various compounds. Specific examples include various diisocyanate compounds described above in the materials of the polyester polyol (A), adduct-modified diisocyanate compounds obtained by reactions of various diisocyanate compounds and diol compounds, biuret-modified compounds of the foregoing, allophanate-modified compounds of the foregoing, and various tri- or higher functional polyisocyanate compounds. These isocyanate compounds (B) may be used alone or in combination of two or more thereof.

Examples of the above-described various diisocyanate compounds include aliphatic diisocyanate compounds such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate;

alicyclic diisocyanate compounds such as cyclohexane-1,4-diisocyanate, isophorone diisocyanate, lysine diisocyanate, dicyclohexylmethane-4,4'-diisocyanate, 1,3-bis(isocyanatomethyl)cyclohexane, and methylcyclohexane diisocyanate; and aromatic diisocyanate compounds such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, and tolylene diisocyanate. These may be used alone or in combination of two or more thereof.

Examples of the diol compounds used as reaction materials of the adduct-modified polyisocyanate compounds include ethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl 1,5-pentanediol, neopentyl glycol, 1,6-hexanediol, 1,4-bis(hydroxymethyl)cyclohexane, and 2,2,4-trimethyl-1,3-pentanediol. These may be used alone or in combination of two or more thereof.

The tri- or higher functional polyisocyanate compounds are not particularly limited as long as they are compounds having three or more isocyanate groups in a single molecule, and may be selected from various compounds. Specific examples include isocyanurate-modified polyisocyanate compounds of various diisocyanate compounds, adduct-modified polyisocyanate compounds obtained by reactions of various diisocyanate compounds and tri- or higher functional polyol compounds, biuret-modified compounds of various diisocyanate compounds, and allophanate-modified compounds of various diisocyanate compounds. These polyisocyanate compounds may be used alone or in combination of two or more thereof.

(Battery Packaging Material Adhesive: Other Components)

A battery packaging material adhesive according to the present invention may additionally include other components as long as advantages of the present invention are not degraded. For example, the polyol composition (A) preferably contains, in addition to the polyester polyol (A), a polycarbonate polyol compound. In this case, the polyester polyol compound and the polycarbonate polyol compound are mixed in proportions: in order to provide an adhesive that exhibits high adhesion to various substrates and that also has high wet-heat resistance, the proportion of the polyester polyol compound relative to the total mass of both compounds is preferably in a range of 30 to 99.5 mass %, preferably in a range of 60 to 99 mass %.

The polycarbonate polyol compound preferably has a number-average molecular weight (Mn) in a range of 300 to 2,000 in order to provide an adhesive that exhibits high adhesion to various substrates and also has high wet-heat resistance. The polycarbonate polyol compound preferably has a hydroxyl value in a range of 30 to 250 mgKOH/g, more preferably in a range of 40 to 200 mgKOH/g. The polycarbonate polyol compound is preferably a polycarbonatediol compound.

The polyol composition (A) preferably contains, in addition to the polyester polyol compound, a polyoxyalkylene-modified polyol compound. In this case, the polyester polyol compound and the polyoxyalkylene-modified polyol compound are mixed in proportions: in order to provide an adhesive that exhibits high adhesion to various substrates and also has high wet-heat resistance, the proportion of the polyester polyol compound relative to the total mass of both compounds is preferably in a range of 30 to 99.5 mass %, preferably in a range of 60 to 99 mass %.

The polyoxyalkylene-modified polyol compound preferably has a number-average molecular weight. (Mn) in a range of 300 to 2,000 in order to provide an adhesive that exhibits high adhesion to various substrates and also has high wet-heat resistance. The polyoxyalkylene-modified polyol compound preferably has a hydroxyl value in a range of 40 to 250 mgKOH/g, more preferably in a range of 50 to 200 mgKOH/g. The polyoxyalkylene-modified polyol compound is preferably a polyoxyalkylene-modified diol compound.

The polyol composition (A) used in the present invention may contain, in addition to the polyester polyol (A), another resin component. In the case of using the other resin component, its amount relative to the total mass of the base resin is preferably 50 mass % or less, preferably 30 mass % or less. Specific examples of the other resin component include epoxy resins. Examples of the epoxy resins include bisphenol-type epoxy resins such as bisphenol A-type epoxy resins, and bisphenol F-type epoxy resins; biphenyl-type epoxy resins such as biphenyl-type epoxy resins, and tetramethylbiphenyl-type epoxy resins; and dicyclopentadiene-phenol addition-reaction-type epoxy resins. These may be used alone or in combination of two or more thereof. Of these, in order to provide an adhesive that exhibits high adhesion to various substrates and also has high wet-heat resistance, bisphenol-type epoxy resins are preferably used.

The epoxy resin preferably has a number-average molecular weight (Mn) in a range of 300 to 2,000 in order to provide an adhesive that exhibits high adhesion to various substrates and also has high wet-heat resistance. The epoxy resin preferably has an epoxy equivalent weight in a range of 150 to 1000 g/eq.

In the case of using the epoxy resin, the polyester polyol (A) and the epoxy resin are mixed in proportions: in order to provide an adhesive that exhibits high adhesion to various substrates and also has high wet-heat resistance, the proportion of the polyester polyol (A) relative to the total mass of the polyester polyol (A) and the epoxy resin is preferably in a range of 30 to 99.5 mass %, preferably in a range of 60 to 99 mass %.

The polyol composition (A) used in the present invention may contain a tackifier. Examples of the tackifier include rosin-based or rosin-ester-based tackifiers, terpen-based or terpenphenol-based tackifiers, saturated hydrocarbon resins, cumarone-based tackifiers, cumarone-indene-based tackifiers, styrene resin-based tackifiers, xylene resin-based tackifiers, phenol resin-based tackifiers, and petroleum resin-based tackifiers. These may be used alone or in combination of two or more thereof. The tackifiers have various softening points mainly depending on molecular weight; however, such a tackifier preferably has a softening point of 80° C. to 160° C. from the viewpoint of, in the case of mixing the tackifier with other resins constituting the polyol composition (A), compatibility, color tone, and thermal stability, for example. In general, the amount of the tackifier used relative to 100 parts by mass of the solid content of resins constituting the polyol composition (A) is in a range of 1 to 30 parts by mass (solid content), preferably 3 to 20 parts by mass, particularly preferably in a range of 5 to 20 parts by mass (solid content).

Examples of the rosin-based or rosin-ester-based include polymerized rosin, disproportionsted rosin, hydrogenated rosin, maleated rosin, fumarated rosin, glycerol esters, pentaerythritol esters, methyl esters, ethyl esters, butyl esters, ethylene glycol esters, diethylene glycol esters, and triethylene glycol esters of the foregoing.

Examples of the terpen-based or terpenphenol-based include oligomer terpen-based, α-pinene polymers, β-pinene polymers, terpenphenol-based, aromatic-modified terpen-based, and hydrogenated terpen-based.

Examples of the petroleum resin-based include petroleum resins obtained by polymerizing a petroleum cut having 5 carbon atoms obtained from pentene, pentadiene, isoprene, and the like; petroleum resins obtained by polymerizing a petroleum cut having 9 carbon atoms obtained from indene, methylindene, vinyltoluene, styrene, α-methylstyrene, β-methylstyrene, and the like; C5-C9 copolymerization petroleum resins obtained from the above-described various monomers, and hydrogenated petroleum resins of the foregoing; petroleum resins obtained from cyclopentadiene and dicyclopentadiene; hydrogenated petroleum resins of the foregoing; and modified petroleum resins obtained by modifying the foregoing petroleum resins with maleic anhydride, maleic acid, fumaric acid, (meth)acrylic acid, phenol, or the like.

Examples of the phenol resin-based include condensates of phenols and formaldehyde. Examples of the phenols include phenol, m-cresol, 3,5-xylenol, p-alkylphenol, and resorcin; examples include resol obtained by an addition reaction of such a phenol and formaldehyde with an alkaline catalyst, and novolac obtained by a condensation reaction of such a phenol and formaldehyde with an acid catalyst. Other examples include rosin phenol resins obtained by adding phenol to rosin using an acid catalyst and performing thermal polymerization.

Of these, preferred are hydrogenated rosin-based having a softening point of 80° C. to 160° C., more preferably a softening point of 90° C. to 110° C.; more preferred are hydrogenated rosin-based having an acid value of 2 to 10 mgKOH/g, and a hydroxyl value of 5 mgKOH/g or less.

Also preferred are terpene phenolic resins having a softening point of 80° C. to 160° C., more preferably a softening point of 100° C. to 140° C.

As a result, higher processing-formability is achieved.

The adhesive composition according to the present invention may contain a ketone resin. Examples of the ketone resin include publicly known and commonly used resins; preferred are formaldehyde resins, cyclohexanone-formaldehyde resins, and ketone-aldehyde condensation resins.

In the case of using the ketone resin, the polyester polyol (A) and the ketone resin are mixed in proportions (each based on solid content): in order to provide an adhesive that exhibits high adhesion to various substrates and also has high wet-heat resistance, the proportion of the polyester polyol (A) relative to the total mass of the polyester polyol (A) and the ketone resin is preferably in a range of 30 to 99.5 mass %, preferably in a range of 60 to 99 mass %.

An adhesive according to another preferred embodiment of the present invention may further include a publicly known phosphoric acid or its derivative. As a result, the adhesive has higher initial adhesion, to overcome problems such as tunneling.

Examples of such a phosphoric acid and its derivative include phosphoric acids such as hypophosphorous acid, phosphorous acid, orthophosphoric acid, and hypophosphoric acid; condensed phosphoric acids such as metaphosphatic acid, pyrophosphoric acid, tripolyphcsphoric acid, polyphosphoric acid, and ultraphosphoric acid; mono- or diesters such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite, monophenyl phosphite, orthophosphate di-2-ethylhexyl, diphenyl orthophosphate, dimethyl phosphite, diethyl phosphite, dipropyl phosphite, dibutyl phosphite, di-2-ethylhexyl phosphite, and diphenyl phosphite; mono- or diesters obtained from condensed phosphoric acids and alcohols; the above-described phosphoric acids to which epoxy compounds are added, such as ethylene oxide and propylene oxide; and epoxy phosphoric acid esters obtained by adding the above-described phosphoric acids to aliphatic or aromatic diglycidyl ethers.

These phosphoric acids and their derivatives may be used alone or in combination of two or more thereof. These can be added by simply mixing them with other components.

The adhesive according to the present invention may include an adhesion promoter. Examples of the adhesion promoter include coupling agents such as silane coupling agents, titanate-based coupling agents, and aluminum-based coupling agents, and epoxy resins.

Examples of the silane coupling agents include aminosilanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxysilane, and N-phenyl-γ-aminopropyltrimethoxysilane; epoxysilanes such as p-(3,4-epoxycyclohexyl)ethyltrimethoxysilane, γ-glycidoxypropyltrimethoxysilane, γ-glycidoxypropyltriethoxysilane, and glycidoxyoctyltrimethoxysilane; vinylsiianes such as vinyltris(p-methoxyethoxy)silane, vinyltriethoxysilane, vinyltrimethoxysilane, octenyltrimethoxysilane, γ-methacryloxypropyltrimethoxysilane, and methacryloxyoctyltrimethoxysilane; polymer-type silane coupling agents such as polymer-type epoxysilanes in which a plurality of alkoxysilyl groups and a plurality of epoxy groups are introduced into a polymer skeleton, and polymer-type aminosilanes in which a plurality of alkoxysilyl groups and a plurality of amino groups are introduced into a polymer skeleton; hexamethyldisilazane, γ-mercaptopropyltrimethoxysilane, and 3-isocyanatopropyltriethoxysilane.

Examples of the titanate-based coupling agents include tetraisopropxytitanium, tetra-n-butoxytitanium, butyl titanate dimer, tetrastearyl titanate, titanium acetylacetonate, titanium lactate, tetraoctylene glycol titanate, titanium lactate, and tetrastearoxytitanium.

Examples of the aluminum-based coupling agents include acetoalkoxy aluminum diisopropylate.

The adhesion promoter is preferably a silane coupling agent, preferably an epoxysilane. As a result, higher processing-formability is achieved.

The content of the adhesion promoter (solid content) relative to 100 parts by mass of the polyol composition (A) (solid content) is preferably 0.1 or more parts by mass, more preferably 0.3 or more parts by mass, more preferably 0.5 or more parts by mass, still more preferably 0.7 or more parts by mass. When the content of the adhesion promoter is higher than a certain content, it contributes less to further improvement in formability; for this reason, the content relative to 100 parts by mass of the polyol composition (A) is not particularly limited, but is preferably 10 or less parts by mass, more preferably 3 or less parts by mass, still more preferably 5 or less parts by mass.

In a battery packaging material adhesive according to the present invention, the polyol composition (A) and the polyisocyanate composition (B) can be mixed in a ratio such that the ratio [NCO]/[OH] of the total number of moles [OH] of hydroxyl groups included in the polyol composition (A) and the number of moles [NCO] of isocyanate groups included in the polyisocyanate composition (B) is in a range of 0.5 to 30, to thereby provide a highly reactive two-component adhesive. In particular, [NCO]/[OH] is preferably in a range of 0.8 to 20.

The battery packaging material adhesive according to the present invention may have the form of solvent type or the form of solvent-free type. In the present invention, "solvent" means an organic solvent having such high solvent power that dissolves the polyol composition (A) or the polyisocyanate composition (B) used in the present invention; "solvent-free" means a form not including such organic solvents having high solvent power, in particular, ethyl acetate or methyl ethyl ketone. Specific examples include esters such as ethyl acetate, butyl acetate, cellosolve acetate; ketones such as acetone, methyl ethyl ketone, isobutyl ketone, and cyclohexanone; ethers such as tetrahydrofuran and dioxane; aromatic hydrocarbons such as toluene and xylene; halogenated hydrocarbons such as methylene chloride and ethylene chloride; dimethyl sulfoxide and dimethylsulfoamide. Of these, in general, ethyl acetate or methyl ethyl ketone is preferably used alone or they are preferably used in combination.

In the case of solvent type, the solvent is used as a reactive medium during production of the polyol composition (A) or the polyisocyanate composition (B), and may further be used as a diluent during coating.

When the battery packaging material adhesive according to the present invention is of solvent type, since reduction in the viscosity can be achieved by dilution using a solvent, the polyol composition (A) or the polyisocyanate composition (B) that may have relatively high viscosity may be used. On the other hand, when the battery packaging material adhesive is of solvent-free type, it is characteristically heated to have a lower viscosity and hence has a priority of having a low viscosity; in order to provide a lower viscosity, a polyisocyanate composition (B) is often employed that has a lower concentration of aromatic compounds, which contribute to viscosity.

The battery packaging material adhesive according to the present invention may contain various additives such as an ultraviolet absorber, an antioxidant, a silicon-based additive, a fluorine-based additive, a rheology control agent, a defoaming agent, an antistatic agent, and an antifogging agent.

(Battery Packaging Material)

As illustrated in FIG. 1, the battery packaging material is constituted by a multilayered body in which at least an outer-layer-side substrate layer 1, an adhesive layer 2, a metal layer 3, and a sealant layer 4 are stacked in this order. In the battery packaging material according to the present invention, the substrate layer 1 serves as the outermost layer, and the sealant layer 4 serves as the innermost layer. Thus, during assembly of the battery, portions of the sealant layer 4 positioned around battery elements are thermally fused together to fully enclose the battery elements, to thereby seal the battery elements.

Figure 2:
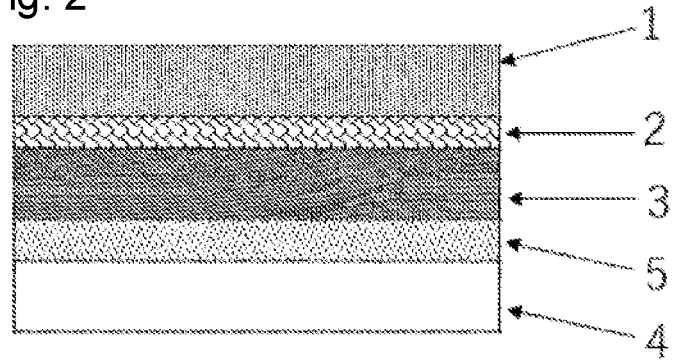
FIG. 2 specifically illustrates a multilayered body according to an embodiment of the present invention, in which an outer-layer-side substrate layer 1, an adhesive layer 2, a metal layer 3, an adhesive layer 5, and a sealant layer 4 are stacked in this order.

The battery packaging material adhesive according to the present invention is used for the adhesive layer 2. As illustrated in FIG. 2, the battery packaging material according to the present invention may optionally have an adhesive layer 5 between the metal layer 3 and the sealant layer 4 in order to improve adhesion therebetween.

[Substrate Layer 1]

In the battery packaging material according to the present invention, the substrate layer 1 is a layer forming the outermost layer. The material forming the substrate layer 1 is not particularly limited as long as it has insulating properties. Examples of the material for forming the substrate layer 1 include resin films of a polyester resin, a polyamide resin, an epoxy resin, an acrylic resin, a fluororesin, a polyurethane resin, a silicone resin, a phenol resin, or a mixture or copolymer of the foregoing. Of these, preferred are polyester resins and polyamide resins, more preferred are biaxially oriented polyester resins and biaxially oriented polyamide resins. Specific examples of the polyester resins include polyethylene terephthalate, polybutylene terephthalate, polyethylene naphthalate, polybutylene naphthalate, copolymerized polyester, and polycarbonate. Specific examples of the polyamide resins include nylon 6, nylon 6,6, copolymers of nylon 6 and nylon 6,6, nylon 6,10, and polymetaxylyleneadipamide (MXD6).

The substrate layer 1 may be formed of a monolayered resin film, or may be formed of two or more resin films stacked in order to have improved pinhole resistance and insulating properties. When the substrate layer 1 is formed of a multilayered resin film, two or more resin films may be stacked with an adhesive component such as an adhesive or an adhesive resin therebetween; the type, amount, and the like of the adhesive component employed are the same as in the adhesive layer 2 or the adhesive layer 5 described later. The method of stacking two or more resin films is not particularly limited and may be selected from publicly known methods such as the dry lamination method and the sandwich lamination method, preferably the dry lamination method. When the dry lamination method is performed to perform stacking, the adhesive layer is preferably formed of an adhesive. In this case, the adhesive layer may have a thickness of, for example, about 0.5 to about 10 μm.

The substrate layer 1 is not particularly limited in terms of thickness as long as the battery packaging material satisfies the above-described properties; the thickness is, for example, about 10 to about 50 µm, preferably about 15 to about 25 µm.

(Metal Layer 3)

In the battery packaging material, the metal layer 3 is a layer that provides increased strength of the battery packaging material, and also functions as a barrier layer for preventing entry of water vapor, oxygen, light, and the like into the battery. Specific examples of the metal forming the metal layer 3 include aluminum, stainless steel, and titanium, preferably aluminum. The metal layer 3 can be formed with a metal foil or by vapor deposition with metal; for example, it is preferably formed with a metal foil, more preferably formed with an aluminum foil. The metal layer 3 is preferably subjected to chemical conversion for at least one of its surfaces, preferably both surfaces in order to, for example, stabilize adhesion and prevent dissolution and corrosion. The chemical conversion is a process of forming an acid-resistant film on the surface of the metal layer.

The metal layer 3 is not particularly limited in terms of thickness as long as the battery packaging material satisfies the above-described properties; the thickness is, for example, about 10 µm to about 50 µm, preferably about 20 µm to about 40 µm.

(Sealant Layer 4)

In the battery packaging material according to the present invention, the sealant layer 4 serves as the innermost layer, and, during assembly of the battery, portions of the sealant layer are thermally fused together to seal the battery elements.

The resin component used for the sealant layer 4 is not particularly limited as long as it is thermally fusible; examples include polyolefin, cyclic polyolefin, carboxylic-acid-modified polyolefin, and carboxylic-acid-modified cyclic polyolefin.

Specific examples of the polyolefin include polyethylenes such as low-density polyethylene, medium-density polyethylene, high-density polyethylene, and linear low-density polyethylene; polypropylenes such as homopolypropylene, block copolymers of polypropylene (for example, block copolymers of propylene and ethylene), and random copolymers of polypropylene (for example, random copolymers of propylene and ethylene); and ethylene-butene-propylene terpolymers. Of these polyolefins, preferred are polyethylene and polypropylene.

The cyclic polyolefin is a copolymer of an olefin and a cyclic monomer. Examples of the olefin as a constituent monomer of the cyclic polyolefin include ethylene, propylene, 4-methyl-1-pentene, styrene, butadiene, and isoprene. Examples of the cyclic monomer as a constituent monomer of the cyclic polyolefin include cyclic alkenes such as norbornene; specific examples include cyclic dienes such as cyclopentadiene, dicyclopentadiene, cyclohexadiene, and norbornadiene. Of these polyolefins, preferred are cyclic alkenes, more preferred is norbornene.

The carboxylic-acid-modified polyolefin is a polymer modified by subjecting the polyolefin to block polymerization or graft polymerization using a carboxylic acid. Examples of the carboxylic acid used for the modification include maleic acid, acrylic acid, itaconic acid, crotonic acid, maleic anhydride, and itaconic anhydride.

The carboxylic-acid-modified cyclic polyolefin is a polymer obtained by copolymerization in which monomers for constituting a cyclic polyolefin are partially replaced by an α,β-unsaturated carboxylic acid or its anhydride, or obtained by subjecting a cyclic polyolefin to block polymerization or graft polymerization using an α,β-unsaturated carboxylic acid or its anhydride. The cyclic polyolefin used for modification using carboxylic acid is the same as above. The carboxylic acid used for modification is the same as that used for modification of the acid-modified cycloolefin copolymer.

The sealant layer 4 may be formed from a single resin component alone, or a blended polymer that is a combination of two or more resin components. The sealant layer 4 may be constituted by a single layer alone, or may be constituted by two or more layers composed of the same resin component or different resin components.

The sealant layer 4 is not particularly limited in terms of thickness as long as the battery packaging material satisfies the above-described properties; the thickness is, for example, about 10 to about 100 µm, preferably about 15 to about 50 µm.

(Adhesive Layer 5)

In the battery packaging material according to the present invention, the adhesive layer 5 is a layer optionally disposed between the metal layer 3 and the sealant layer 4 in order to firmly bond these layers together.

The adhesive layer 5 is formed from an adhesive with which the metal layer 3 and the sealant layer 4 can be bonded together. The adhesive layer used for the adhesive layer 5 may be formed from an adhesive selected from publicly known adhesives such as an adhesive that is a combination of a polyolefin adhesive and a polyisocyanate, an adhesive that is a combination of a polyol and a polyisocyanate, and an adhesive containing a modified polyolefin resin, a heterocyclic compound, and a curing agent. Alternatively, an adhesive such as acid-modified polypropylene may be melted and extruded through a T-die extruder over the metal layer to form the adhesive layer 5; on the adhesive layer 5, the sealant layer 4 may be disposed to bond together the metal layer 3 and the sealant layer 4.

When both of the adhesive layer 2 and the adhesive layer 5 need aging, they may be collectively subjected to aging. The aging can be performed at temperatures of room temperature to 90° C., to thereby complete curing in 2 days to 2 weeks, and formability is exhibited.

The adhesive layer 5 is not particularly limited in terms of thickness as long as the battery packaging material satisfies the above-described properties; the thickness is, for example, about 0.5 to about 50 µm, preferably about 2 to about 30 µm.

[Coating Layer 6]

In the battery packaging material according to the present invention, for the purpose of providing, for example, improved design, electrolyte resistance, scratching resistance, and formability, a coating layer 6 may be optionally disposed on the substrate layer 1 (on a side of the substrate layer 1, the side being opposite to the metal layer 3). The coating layer 6 is to be positioned as the outermost layer during assembly of the battery.

The coating layer 6 may foe formed from, for example, polyvinylidene chloride, a polyester resin, a urethane resin, an acrylic resin, or an epoxy resin. Of these, the coating layer 6 is preferably formed from a two-component curable resin. Examples of the two-component curable resin for forming the coating layer 6 include a two-component curable urethane resin, a two-component curable polyester resin, and a two-component curable epoxy resin. The coating layer 6 may contain a matting agent.

Examples of the matting agent include fine particles having a particle size of about 0.5 nm to about 5 µm. The material of the matting agent is not particularly limited; examples of the material include metals, metal oxides, inorganic materials, and organic materials. The matting agent is also not particularly limited in terms of shape; examples of the shape include a spherical shape, a fibrous shape, a plate shape, an indefinite shape, and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylon, crosslinked acrylic, crosslinked styrene, crosslinked polyethylene, benzoguanamine, gold, aluminum, copper, and nickel. These matting agents may be used alone or in combination of two or more thereof. Of these matting agents, from the viewpoint of, for example, dispersion stability and cost, preferred are silica, barium sulfate, and titanium oxide. Such a matting agent may be subjected to various surface treatments such as an insulation treatment and a high-dispersibility treatment.

The method for forming the coating layer 6 is not particularly limited, and may be, for example, a method of applying a two-component curable resin for forming the coating layer 6 to one of the surfaces of the substrate layer 1. In the case of adding the matting agent, the matting agent may be added to the two-component curable resin, and mixed and then applied.

(Method for Producing Battery Packaging Material)

A method for producing a battery packaging material according to the present invention is not particularly limited as long as the method provides a multilayered body in which layers having predetermined compositions are stacked. The method is, for example, the following method.

First, a multilayered body (hereafter, also referred to as "multilayered body A") in which a substrate layer 1, an adhesive layer 2, and a metal layer 3 are stacked in this order is formed. Specifically, the multilayered body A can be formed by a dry lamination method: to the outer-layer-side substrate layer 1 or the metal layer 3 optionally having a chemical conversion surface, a battery packaging material adhesive according to the present invention is applied by a coating method such as an extrusion method, a gravure coating method, or a roll coating method, and dried; subsequently, the metal layer 3 or the outer-layer-side substrate layer 1 is placed thereon, and the adhesive layer 2 is cured.

Subsequently, on the metal layer 3 of the multilayered body A, a sealant layer 4 is formed. When the sealant layer 4 is directly formed on the metal layer 3, a resin component forming the sealant layer 4 may be applied onto the metal layer 3 of the multilayered body A by a method such as a gravure coating method or a roll coating method. When an adhesive layer 5 is formed between the metal layer 3 and the sealant layer 4, this is achieved by, for example, a method of co-extruding the adhesive layer 5 and the sealant layer 4 so as to be stacked on the metal layer 3 of the multilayered body A (co-extrusion lamination method); a method of forming another multilayered body including the adhesive layer 5 and the sealant layer 4, and stacking the multilayered body onto the metal layer 3 of the multilayered body A by a thermal lamination method; a method in which an adhesive for forming the adhesive layer 5 is placed on the metal layer 3 of the multilayered body A by, for example, an extrusion method or a method of subjecting a solution to coating, to drying at a high temperature, and further to baking, and, on the adhesive layer 5, a sealant layer 4 formed as a sheet film in advance is placed by a thermal lamination method; and a method in which, while the adhesive layer 5 being melted is poured into the gap between the metal layer 3 of the multilayered body A and the sealant layer 4 formed in advance as a sheet film, the multilayered body A and the sealant layer 4 are laminated together with the adhesive layer 5 therebetween (sandwich lamination method).

When a coating layer 6 is formed, the coating layer 6 is disposed on a surface of the outer-layer-side substrate layer 1, the surface being opposite to the metal layer 3. The coating layer 6 can be formed by, for example, applying the above-described resin for forming the coating layer 6 to the surface of the outer-layer-side substrate layer 1. Incidentally, the order of performing the following steps is not particularly limited: the step of forming the metal layer 3 on a surface of the outer-layer-side substrate layer 1, and the step of forming the coating layer 6 on a surface of the outer-layer-side substrate layer 1. For example, after the coating layer 6 is formed on a surface of the outer-layer-side substrate layer 1, the metal layer 3 may be formed on a surface of the outer-layer-side substrate layer 1, the surface being opposite to the coating layer 6.

In this way, a multilayered body is formed that is constituted by optionally formed coating layer C/outer-layer-side substrate layer 1/adhesive layer 2/metal layer 3 having surface optionally subjected to chemical conversion/optionally formed adhesive layer 5/sealant layer 4. In order to increase the adhesion of the adhesive layer 2 and the optionally formed adhesive layer 5, heating treatment may further be performed such as treatment using contact with a heat roll, using hot air, or using near- or far-infrared radiation. Such heating treatment may be performed under conditions, for example, at 150° C. to 250° C. for 1 to 5 minutes.

In the battery packaging material according to the present invention, layers constituting the multilayered body may be optionally subjected to surface activation treatment such as corona treatment, blasting treatment, oxidation treatment, or ozone treatment in order to improve or stabilize, for example, film formability, stacking processing, and suitability for secondary processing of final products (pouch packaging and embossing).

(Battery Container)

A battery container according to the present invention can be obtained by subjecting the above-described battery packaging material to forming such that, the outer-layer-side substrate layer 1 provides a convex surface, and the sealant layer 4 provides a concave surface.

Examples of the method of forming the concave portion include the following methods.

Thermal pressure forming: a method of holding the battery packaging material between a lower mold having a port for feeding high-temperature high-pressure air, and an upper mold having a pocket recess, and heat-softening the battery packaging material under feeding of air to form a concave portion Preheater flat plate pressure forming: a method of heat-softening the battery packaging material, subsequently holding the battery packaging material between a lower mold having a port for feeding high-pressure air, and an upper mold having a pocket recess, and feeding air to form a concave portion Drum vacuum forming: a method of using a heat drum to partially heat-softer, the battery packaging material, subsequently, in the drum having a pocket recess, evacuating the recess to form a concave portion Pin forming: a method of heat-softening a bottom material sheet, and subsequently pressing the bottom material sheet between upper and lower molds having a pocket feature Preheater plug-assist pressure forming: a method of heat-softening the battery packaging material, subsequently holding the battery packaging material between a lower mold having a port for feeding high-pressure air, and an upper mold having a pocket recess, and feeding air to form a concave portion, wherein, during the forming, a male plug is moved upward and downward to assist the forming Of these, preferred is preheater plug-assist pressure forming, which is thermal vacuum forming, because it provides a formed bottom material having a uniform thickness.

(Applications of Battery Packaging Material)

A battery packaging material according to the present invention is used as a battery container for sealing and containing battery elements such as a positive electrode, a negative electrode, electrolyte, and the like.

Specifically, battery elements at least including a positive electrode, a negative electrode, and electrolyte are covered with a battery packaging material according to the present invention such that, with metal terminals connected to the positive electrode or the negative electrode and protruding outward, a flange portion (a region where portions of the sealant layer are in contact with each other) is formed around the battery elements; the portions of the sealant layer of the flange portion are heat-sealed together to seal the battery elements, to thereby provide a battery using the battery packaging material. When a battery packaging material according to the present invention is used to enclose battery elements, it is used such that the sealant portion of the battery packaging material according to the present invention is positioned inside (provides a surface in contact with the battery elements).

A battery packaging material according to the present invention may be used for primary batteries and secondary batteries, and is preferably used for secondary batteries. The type of secondary batteries to which a battery packaging material according to the present invention is applied is not particularly limited; examples include lithium-ion batteries, lithium-ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, multivalent cation batteries, condensers, and capacitors. Of these secondary batteries, preferred batteries to which a battery packaging material according to the present invention is applied include lithium-ion batteries and lithium-ion polymer batteries.

EXAMPLES

Hereinafter, the present invention will be described further in detail with reference to specific Synthesis Examples and Examples; however, the present invention is not limited to these Examples. Incidentally, in the following Examples, "part" and "%" respectively represent "part by mass" and "mass %" unless otherwise specified.

Synthesis Example 1-1

A flask having a stirring rod, a temperature sensor, and a rectifying column was charged with 791 parts by weight of isophthalic acid (manufactured by MITSUBISHI GAS CHEMICAL COMPANY, INC.), 339 parts by weight of terephthalic acid (manufactured by Mitsui Chemicals, Inc.), 20 parts by weight of trimellitic anhydride (manufactured by MITSUBISHI GAS CHEMICAL COMPANY, INC.), 738 parts by weight of 1,6-hexanediol (manufactured by BASF), 107 parts by weight of neopentyl glycol (manufactured by MITSUBISHI GAS CHEMICAL COMPANY, INC.), and 4.0 parts by weight of an organic titanium compound ("ORGATIX TC-100", manufactured by Matsuraoto Fine Chemical Co., Ltd.); dry nitrogen was caused to flow into the flask under stirring, and the content was heated to 240° C. while generated water was driven off. Subsequently, an esterification reaction was performed with an increased degree of vacuum of 30 torr, and the reaction was stopped when the resin acid value became 1.50 mgKOH/g or less. The resultant polyester polyol was diluted with ethyl acetate to a resin solid content of 58%, to obtain a polyester polyol (A1-1) having a number-average molecular weight (Mn) of 7,000, a weight-average molecular weight (Mw) of 23,500, a resin hydroxyl value of 22.4 mgKOH/g, a resin acid value of 1.26 mgKOH/g, and a glass transition temperature (Tg) of 2.1° C.

Synthesis Example 1-2

A flask having a stirring rod, a temperature sensor, and a concentration tube was charged with 900 parts by weight of the obtained polyester polyol (A1-1), 0.16 parts by weight of an organo-tin compound ("NEOSTANN U-130", manufactured by Nitto Kasei Co., Ltd.), 268 parts by weight of ethyl acetate, and 9.53 parts by weight of hexamethylene diisocyanate ("Desmodur H", manufactured by Sumika Covestro Urethane Co., Ltd.); dry nitrogen was caused to flow into the flask, and the content was heated at 75° C. to 78° C. under stirring to perform a chain extension reaction. The reaction was stopped when the resin NCO % became 0.25% or less, and ethyl acetate was used to achieve dilution to a resin solid content of 40%, to obtain a polyester polyol (A1-2) having a number-average molecular weight (Mn) of 11,800, a weight-average molecular weight (Mw) of 56,300, a resin hydroxyl value of 8.5 mgKOH/g, a resin acid value of 1.26 mgKOH/g, and a glass transition temperature (Tg) of 8.4° C.

Synthesis Example 1-3

A flask having a stirring rod, a temperature sensor, and a concentration tube was charged with 900 parts by weight of the obtained polyester polyol (A1-1), 0.16 parts by weight of an organo-tin compound, 270 parts by weight of ethyl acetate, and 11.10 parts by weight of hexamethylene diisocyanate; dry nitrogen was caused to flow into the flask, and the content was heated at 75° C. to 78° C. under stirring to perform a chain extension reaction. The reaction was stopped when the resin NCO % became 0.25% or less, and ethyl acetate was used to achieve dilution to a resin solid content of 40%, to obtain a polyester polyol (A1-3) having a number-average molecular weight (Mn) of 12,400, a weight-average molecular weight (Mw) of 71,200, a resin hydroxyl value of 7.0 mgKOH/g, a resin acid value of 1.31 mgKOH/g, and a glass transition temperature (Tg) of 9.0° C.

Synthesis Example 1-4

A flask having a stirring rod, a temperature sensor, and a concentration tube was charged with 900 parts by weight of the obtained polyester polyol (A1-1) polyester polyol (A), 0.16 parts by weight of an organo-tin compound, 272 parts by weight of ethyl acetate, and 12.68 parts by weight of hexamethylene diisocyanate; dry nitrogen was caused to flow into the flask, and the content was heated at 75° C. to 78° C. under stirring to perform a chain extension reaction. The reaction was stopped when the resin NCO % became 0.25% or less, and ethyl acetate was used to achieve dilution to a resin solid content of 40%, to obtain a polyester polyol (A1-4) having a number-average molecular weight (Mn) of 12,100, a weight-average molecular weight (Mw) of 95,400, a resin hydroxyl value of 5.2 mgKOH/g, a resin acid value of 1.29 mgKOH/g, and a glass transition temperature (Tg) of 9.4° C.

Synthesis Example 1-5

A flask having a stirring rod, a temperature sensor, and a concentration tube was charged with 900 parts by weight of the obtained polyester polyol (A1-1), 0.16 parts by weight of an organo-tin compound ("NEOSTANN J-130", manufactured by Nitto Kasei Co., Ltd.), 273 parts by weight of ethyl acetate, and 13.47 parts by weight of hexamethylene diisocyanate; dry nitrogen was caused to flow into the flask, and the content was heated at 75° C. to 78° C. under stirring to perform a chain extension reaction. The reaction was stopped when the resin NCO % became 0.25% or less, and ethyl acetate was used to achieve dilution to a resin solid content of 40%, to obtain a polyester polyol (A1-5) having a number-average molecular weight (Mn) of 13,700, a weight-average molecular weight (Mw) of 128,600, a resin hydroxyl value of 7.6 mgKOH/g, a resin acid value of 1.35 mgKOH/g, and a glass transition temperature (Tg) of 9.9° C.

Synthesis Example 1-6

A flask having a stirring rod, a temperature sensor, and a concentration tube was charged with 900 parts by weight of the obtained polyester polyol (A1-1), 0.16 parts by weight of an organo-tin compound, 278 parts by weight of ethyl acetate, and 17.75 parts by weight of isophorone diisocyanate ("VESTANAT IPDI", manufactured by Evonik Industries); dry nitrogen was caused to flow into the flask, and the content was heated at 75° C. to 78° C. under stirring to perform a chain extension reaction. The reaction was stopped when the resin NCO % became 0.25% or less, and ethyl acetate was used to achieve dilution to a resin solid content of 30%, to obtain a polyester polyol (A1-6) having a number-average molecular weight (Mn) of 13,800, a weight-average molecular weight (Mw) of 91,300, a resin hydroxyl value of 7.6 mgKOH/g, a resin acid value of 1.39 mgKOH/g, and a glass transition temperature (Tg) of 12.8° C.

Synthesis Example 1-7

A flask having a stirring rod, a temperature sensor, and a condenser was charged with 74.9 parts by weight of the polyester polyol (A1-1), 23.4 parts by weight of ethyl acetate, 1.7 parts by weight of 4,4-diphenylmethane diisocyanate ("Lupranate MT", manufactured by Tosoh Corporation), and 0.01 parts by weight of an organo-tin compound; dry nitrogen was caused to flow into the flask, and the content was heated at 75° C. to 78° C. under stirring to perform a chain extension reaction. The reaction was stopped when the isocyanate wt % became 0.05% or less, and methyl ethyl ketone was used to achieve dilution to a resin solid content of 30%, to obtain a polyester polyol (A1-7) having a number-average molecular weight (Mn) of 12,000, a weight-average molecular weight (Mw) of 168,900, a hydroxyl value of 6.8 mgKOH/g, an acid value of 1.34 mgKOH/g, and a glass transition temperature (Tg) of 14.9° C.

Synthesis Example 2-1

Synthesis of Polyester Polyol (A2-1)

A flask having a stirring rod, a temperature sensor, and a rectifying column was charged with 1102 parts by weight of isophthalic acid (manufactured by MITSUBISHI GAS CHEMICAL COMPANY, INC.), 473 parts by weight of terephthalic acid (manufactured by Mitsui Chemicals, Inc.), 1070 parts by weight of 1,6-hexanediol (manufactured by BASF), 156 parts by weight of neopentyl glycol (manufactured by MITSUBISHI GAS CHEMICAL COMPANY, INC.), and 0.46 parts by weight of an organic titanium compound ("ORGATIX TC-100", manufactured by Matsumoto Fine Chemical Co., Ltd.); dry nitrogen was caused to flow into the flask under stirring, and the content was heated to 240° C. while generated water was driven off. Subsequently, an esterification reaction was performed with an increased degree of vacuum of 30 torr, and the reaction was stopped when the resin acid value became 2.00 mgKOH/g or less. Cooling was performed to 150° C., and subsequently a mixed solution of ethyl acetate-toluene (mixed in a ratio of 1:1) was used to achieve dilution to a resin solid content of 50%, to obtain a polyester polyol (A2-1) having a number-average molecular weight. (Mn) of 4,000, a weight-average molecular weight (Mw) of 9,700, a resin hydroxyl value (in terms of solid content) of 38.8 mgKOH/g, a resin acid value (in terms of solid content) of 0.63 mgKOH/g, and a glass transition temperature (Tg) of 2.8° C.

Synthesis Example 2-2

Synthesis of Polyester Polyol (A2-2)

A flask having a stirring rod, a temperature sensor, and a condenser was charged with 1000 parts by weight of the polyester polyol (A2-1), 25.7 parts by weight of hexamethylene diisocyanate ("Desmodur H", manufactured by Sumika Covestro Urethane Co., Ltd.), and 0.16 parts by weight of an organo-tin compound ("REOSTANN U-130", manufactured by Nitto Kasei Co., Ltd.); dry nitrogen was caused to flow into the flask, and the content was heated at 75° C. to 78° C. under stirring to perform a chain extension reaction. The reaction was stopped when the isocyanate wt % became 0.05% or less, and a mixed solvent of ethyl acetate-toluene (mixed in a ratio of 1:1) was used to achieve dilution to a resin solid content of 50%, to obtain a polyester polyol (A2-2) having a number-average molecular weight (Mn) of 11,000, a weight-average molecular weight (Mw) of 50,000, a resin hydroxyl value (in terms of solid content) of 3.9 mgKOH/g, a resin acid value (in terms of solid content) of 1.06 mgKOH/g, and a glass transition temperature (Tg) of 7.1° C.

Synthesis Example 2-3

Synthesis of Polyester Polyol (A2-3)

A flask having a stirring rod, a temperature sensor, and a condenser was charged with 1000 parts by weight of the polyester polyol (A2-1), 26.0 parts by weight of tolylene diisocyanate ("COSMONATE T-80", manufactured by Mitsui Chemicals, Inc.), and 0.16 parts by weight of an organo-tin compound ("NEOSTANN U-130", manufactured by Nitto Kasei Co., Ltd.); dry nitrogen was caused to flow into the flask, and the content was heated at 75° C. to 78° C. under stirring to perform a chain extension reaction. The reaction was stopped when the isocyanate wt % became 0.05% or less, and a mixed solvent of ethyl acetate-toluene (mixed in a ratio of 1:1) was used to achieve dilution to a resin solid content of 50%, to obtain a polyester polyol (A2-3) having a number-average molecular weight (Mn) of 16,000, a weight-average molecular weight (Mw) of 47,000, a resin hydroxyl value (in terms of solid content) of 4.9 mgKOH/g, a resin acid value (solid content) of 0.70 mgKOH/g, and a glass transition temperature (Tg) of 13.3° C.

Synthesis Example 2-4

Synthesis of Polyester Polyol (A2-4)

A flask having a stirring rod, a temperature sensor, and a condenser was charged with 1000 parts by weight of the polyester polyol (A2-1), 28.1 parts by weight of meta-xylylene diisocyanate ("Takenate 500", manufactured by Mitsui Chemicals, Inc.), and 0.16 parts by weight of an organo-tin compound ("NEOSTANN U-130", manufactured by Nitto Kasei Co., Ltd.); dry nitrogen was caused to flow into the flask, and the content was heated at 75° C. to 78° C. under stirring to perform a chain extension reaction. The reaction was stopped when the isocyanate wt % became 0.05% or less, and a mixed solvent of ethyl acetate-toluene (mixed in a ratio of 1:1) was used to achieve dilution to a resin solid content of 50%, to obtain a polyester polyol (A2-4) having a number-average molecular weight (Mn) of 11,000, a weight-average molecular weight (Mw) of 28,000, a resin hydroxyl value (in terms of solid content) of 6.1 mgKOH/g, a resin acid value (in terms of solid content) of 0.64 mgKCH/g, and a glass transition temperature (Tg) of 6.1° C.

Synthesis Example 3-1

Synthesis of Polyester Polyol (A3-1)

A flask having a stirring rod, a temperature sensor, and a rectifying column was charged with 1261 parts by weight of isophthalic acid (manufactured by MITSUBISHI GAS CHEMICAL COMPANY, INC.), 540 parts by weight of terephthalic acid (manufactured by Mitsui Chemicals, Inc.), 667 parts by weight of 1,6-hexanediol (manufactured by BASF), 182 parts by weight of neopentyl glycol (manufactured by MITSUBISHI GAS CHEMICAL COMPANY, INC.), 253 parts by weight of ethylene glycol (manufactured by Mitsubishi Chemical Corporation), and 0.5 parts by weight of an organic titanium compound ("ORGATIX TC-100", manufactured by Matsumoto Fine Chemical Co., Ltd.); dry nitrogen was caused to flow into the flask under stirring, and the content was heated to 240° C. while generated water was driven off. Subsequently, an esterification reaction was performed with an increased degree of vacuum of 30 torr, and the reaction was stopped when the resin acid value became 2.00 mgKOH/g or less. Cooling was performed to 150° C., and subsequently a mixed solution of ethyl acetate-toluene (mixed in a ratio of 1:1) was used to achieve dilution to a resin solid content of 50%, to obtain a polyester polyol (A3-1) having a number-average molecular weight (Mn) of 6,700, a weight-average molecular weight (Mw) of 17,000, a resin hydroxyl value of 17.2 mgKOH/g, a resin acid value of 1.58 mgKOH/g, and a glass transition temperature (Tg) of 23.6° C.

Synthesis Example 3-2

Synthesis of Polyester Polyol (A3-2)

A flask having a stirring rod, a temperature sensor, and a rectifying column was charged with 1261 parts by weight of isophthalic acid (manufactured by MITSUBISHI GAS CHEMICAL COMPANY, INC.), 540 parts by weight of terephthalic acid (manufactured by Mitsui Chemicals, Inc.), 889 parts by weight of 1,6-hexanediol (manufactured by BASF), 171 parts by weight of neopentyl glycol (manufactured by MITSUBISHI GAS CHEMICAL COMPANY, INC.), 102 parts by weight of ethylene glycol (manufactured by Mitsubishi Chemical Corporation), and 0.5 parts by weight of an organic titanium compound ("ORGATIX TC-100", manufactured by Matsumoto Fine Chemical Co., Ltd.); dry nitrogen was caused to flow into the flask under stirring, and the content was heated to 240° C. while generated water was driven off. Subsequently, with an increased degree of vacuum of 30 toor, an esterification reaction was performed. The reaction was stopped when the resin acid value became 2.00 mgKOH/g or less. Cooling was performed to 150° C., and subsequently a mixed solution of ethyl acetate-toluene (mixed in a ratio of 1:1) was used to achieve dilution to a resin solid content of 50%, to obtain a polyester polyol (A3-2) having a number-average molecular weight (Mn) of 12,000, a weight-average molecular weight (Mw) of 28,000, a resin hydroxyl value of 10.1 mgKOH/g, a resin acid value of 1.96 mgKOH/g, and a glass transition temperature (Tg) of 15.6° C.

Synthesis Example 3-3

Synthesis of Polyester Polyol (A3-3)

A flask having a stirring rod, a temperature sensor, and a rectifying column was charged with 1169 parts by weight of isophthalic acid (manufactured by MITSUBISHI GAS CHEMICAL COMPANY, INC.), 501 parts by weight of terephthalic acid (manufactured by Mitsui Chemicals, Inc.), 1042 parts by weight of 1,6-hexanediol (manufactured by BASF), 168 parts by weight of neopentyl glycol (manufactured by MITSUBISHI GAS CHEMICAL COMPANY, INC.), 0.5 parts by weight of an organic titanium compound ("ORGATIX TC-100", manufactured by Matsumoto Fine Chemical Co., Ltd.); dry nitrogen was caused to flow into the flask under stirring, and the content was heated to 240° C. while generated water was driven off. Subsequently, an esterification reaction was performed with an increased degree of vacuum of 30 torr, and the reaction was stopped when the resin acid value became 2.00 mgKOH/g or less. Cooling was performed to 150° C., and subsequently a mixed solution of ethyl acetate-toluene (mixed in a ratio of 1:1) was used to achieve dilution to a resin solid content of 50%, to obtain a polyester polyol (A3-3) having a number-average molecular weight (Mn) of 13,000, a weight-average molecular weight (Mw) of 29,000, a resin hydroxyl value of 9.5 mgKOH/g, a resin acid value of 0.18 mgKOH/g, and a glass transition temperature (Tg) of 8.2° C.

Comparative Synthesis Example 1

A flask having a stirring rod, a temperature sensor, and a rectifying column was charged with 164 parts by weight of neopentyl glycol, 1125 parts by weight of 1,6-hexanediol, 351 parts by weight of terephthalic acid, 351 parts by weight of isophthalic acid, 928 parts by weight of adipic acid, and 0.89 parts by weight of an organic titanium compound; dry nitrogen was caused to flow into the flask under stirring, and the content was heated to 240° C. while generated water was driven off. Subsequently, an esterification reaction was performed with an increased degree of vacuum of 30 torr, and the reaction was stopped when the resin acid value became 2.00 mgKOH/g or less. Cooling was performed to 150° C., and subsequently ethyl acetate was used to achieve dilution to a resin solid content of 60.0%, to obtain a polyester polyol (AH-1) having a number-average molecular weight (Mn) of 5,200, a weight-average molecular weight (Mw) of 32,000, a resin hydroxyl value of 6.6 mgKOH/g, a resin acid value of 1.86 mgKOH/g, and a glass transition temperature (Tg) of −43.6° C.

The properties of the polyester polyols obtained in the above-described Synthesis Examples were measured in the following manner.
(Method of Measuring Molecular Weight)
Measurement apparatus: HLC-8320GPC, manufactured by Tosoh Corporation
Columns: TSKgel 4000HXL, TSKgel 3000HXL, TSKgel 2000HXL, and TSKgel 1000HXL, manufactured by Tosoh Corporation
Detector: RI (differential refractometer)
Data processing: Multistation GPC-8020 model II, manufactured by Tosoh Corporation
Measurement conditions:
Column temperature: 40° C.
Developing solvent: tetrahydrofuran
Flow rate: 0.35 ml/min
Standards: monodisperse polystyrenes
Sample: obtained by filtering 0.2 mass % (in terms of resin solid content) tetrahydrofuran solution through microfilter (100 μl)
(Method of Measuring Acid Value)
A sample (5.0 g) was accurately weighed, dissolved in 30 mL of tetrahydrofuran, and titrated with 0.1 N potassium hydroxide solution (methanolic). The indicator employed was phenolphthalein. The measurement result was converted into the amount of potassium hydroxide required to neutralize 1 g of the sample, in units of mgKOH/g. Incidentally, when the sample contains an organic solvent, the acid value directly measured by the above-described measurement method was converted, using the nonvolatile content of the solution, into a solid-content acid value.
(Method of Measuring Hydroxyl Value)
A sample (4.0 g) was accurately weighed, mixed with 25 mL of an acetylation agent composed of acetic anhydride/pyridine (volume ratio: 1/19), and sealed and heated at 100° C. for 1 hour. After the acetylation, 10 mL of ion-exchanged water and 100 mL of tetrahydrofuran were added, and titration was performed using a 0.5 N potassium hydroxide solution (alcoholic). The indicator employed was phenolphthalein. The measurement result was converted into the amount of potassium hydroxide required for neutralizing acetic acid generated in acetylation of 1 g of the sample, in units of mgKOH/g. Incidentally, when the sample contains an organic solvent, the hydroxyl value directly measured by the above-described measurement method was converted, using the nonvolatile content of the solution, into a solid-content hydroxyl value.
(Method of Measuring Glass Transition Temperature)
DSC was used to heat a sample (5 mg), in a nitrogen stream at 30 mL/min, from room temperature at 10° C./min to 200° C., subsequently to cool the sample at 10° C./min to −80° C., again to heat the sample at 10° C./min to 150° C., in order to measure a DSC curve. In the measurement result observed at the second temperature rise process, a lower-temperature-side baseline is extended to the higher-temperature side to draw a straight line; a tangential line is drawn at a point of the maximum gradient of the stepped curve of glass transition; the point of intersection of these lines is determined as the point of glass transition, and the temperature of this point is determined as the glass transition temperature.

<Preparation of Battery Packaging Material Adhesives>

Example 1-1

To 10 parts of the polyester polyol (A1-2), 0.07 parts of KBM-403 (silane coupling agent manufactured by Shin-Etsu Chemical Co., Ltd.; nonvolatile content: 100%) was added and sufficiently stirred until KBM-403 was completely dissolved. To this, 2 parts of KW-75 (polyisocyanate manufactured by DIC Corporation; nonvolatile content: 75%; NCO %: 13.3) and ethyl acetate were added such that the nonvolatile content became 25%, and sufficiently stirred to prepare a battery packaging material adhesive (1-1).

Example 1-2 to Example 1-6

Battery packaging material adhesives (1-2) to (1-6) were produced as in Example 1-1 except that the materials and compositions in Table 1 were used.

Example 1-7 to Example 1-11

Battery packaging material adhesives (1-7) to (1-11) were produced as in Example 1-1 except that the materials and compositions in Table 2 were used.

Example 2-1 to Example 2-6

Battery packaging material adhesives of Example 2-1 to 2-6 were produced as in Example 1-1 except that the materials and compositions in Table 3 were used.

Example 3-1, Example 3-2

Battery packaging material adhesives of Examples 3-1 and 3-2 were produced as in Example 1-1 except that the materials and compositions in Table 3 were used.

Comparative Example 1

A battery packaging material adhesive (1-12) was produced as in Example 1-1 except that the materials and composition in Table 4 were used.

Incidentally, among the values in Tables 1 to 4, the mixing amounts of polyester polyols (A1-2) to (A1-5), (A2-2) to (A2-3), (A3-1) to (A3-3), and (AH-1) are values including amounts of solvents, and their solid contents are described in the above-described Synthesis Examples. The mixing amounts of KBM403 are solid contents. The mixing amounts of KW-75 are values including the amounts of solvents. The mixing amounts of YS POLYSTER (terpene phenolic resin manufactured by YASUHARA CHEMICAL CO., LTD.) are solid contents.

<Production of Battery Packaging Material: Configuration in FIG. 2>

Example 1-1

To the matt surface of an aluminum foil having a thickness of 30 μm and serving as the metal layer 3, the battery packaging material adhesive (1-1) was applied to form the adhesive layer 2 using a dry laminator in such an amount that the coating amount after dry became 4 g/square meters; after the solvent was evaporated, an oriented polyamide film having a thickness of 25 μm was placed thereon as the outer-layer-side substrate layer 1.

Subsequently, in the resultant multilayered film, to the glossy surface of the aluminum foil of the metal layer 3, adhesive P for the adhesive layer 5 was applied in a coating amount of 4 g/square meters using a dry laminator; after the solvent was evaporated, an unoriented polypropylene film having a thickness of 40 μm was placed thereon as the sealant layer 4; subsequently, curing (aging) at 80° C. for 2 days was performed to cure the adhesives to obtain a laminated body.

Outer-layer-side substrate layer 1: polyamide film "Emblem" 25 nm (manufactured by UNITIKA LTD.)

Adhesive layer 2: battery packaging material adhesive (1) of Example

Metal layer 3: aluminum foil "1N30" 30 μm (manufactured by Toyo Aluminium K.K.), Sealant layer 4: unoriented polypropylene film "AROMA ET20" 40 μm (manufactured by OKAMOTO INDUSTRIES, INC.)

Adhesive P for adhesive layer 5: adhesive containing "EXP130610 basin resin" (manufactured by DIC Corporation) as the base resin, and "Additive EP-200" (manufactured by DIC Corporation) as a curing agent that are mixed in weight ratio of base resin/curing agent=100/4.

Example 1-2 to Example 1-11

As in Example 1-1, battery packaging materials of Example 1-2 to Example 1-11 were obtained using, as the adhesive layers 2, the battery packaging material adhesives (1-2) to (1-11).

Example 2-1 to Example 2-6

As in Example 1-1, battery packaging materials of Example 2-1 to Example 2-6 were obtained using, as the adhesive layers 2, the battery packaging material adhesives of Examples 2-1 to 2-6.

Example 3-1, Example 3-2

As in Example 1-1, battery packaging materials of Examples 3-1 and 3-2 were obtained using, as the adhesive layers 2, the battery packaging material adhesives of Examples 3-1 and 3-2.

Comparative Example 1

The battery packaging material of Comparative Example 1 was obtained as in Example 1-1 except that the battery packaging material adhesive (1-12) was used.

(Evaluation Method)

The battery packaging materials were evaluated in the following manner.

<Adhesion Strength>

"Autograph AGS-J" from SHIMADZU CORPORATION was used to evaluate, under conditions at a peeling rate of 100 mm/min, with a peeling width of 15 mm, and with a peeling mode of 180° peeling, the adhesion strength of the interface between the outer-layer-side substrate layer 1 and the metal layer 3 of the battery packaging material of Example or Comparative Example. The higher the value, the more suitable the battery packaging material adhesive is.

<Formability>

A "1-ton desktop servo press (SBN-1000)" manufactured by YAMAOKA SEISAKUSHO CO., LTD. was used to cut the battery packaging material of Example or Comparative Example into dimensions of 60×60 mm to provide a blank (material for forming, raw material). The blank was subjected to stretch forming, with the aluminum foil's matt surface disposed on the protrusion side, using a straight die for variable forming height with forming heights set at 3.0 mm and 3.5 mm, and evaluated for formability on the basis of whether or not the aluminum foil broke and whether or not lifting occurred between layers.

In the employed die, the punch has the following shape: a square having 30 mm sides, a corner radius of 2 mm, and a punch shoulder radius of 1 mm. In the employed die, the die cavity has a square shape having 34 mm sides, a die cavity corner radius of 2 mm, and a die cavity shoulder radius of 1 mm. The clearance between the punch and the die cavity is 0.3 mm on either side. Due to the clearance, a slope is formed in accordance with the forming height.

Good: breakage of the aluminum foil and lifting between layers do not occur, thus practically good Fair: pinholes are observed in the aluminum foil, but breakage of the aluminum foil and lifting between layers do not occur, thus practically acceptable Poor: the aluminum foil is severely broken, or lifting occurs between layers <Heat Resistance>

A "1-ton desktop servo press (SBN-1000)" manufactured by YAMAOKA SEISAKUSHO CO., LTD. was used. The battery packaging material of Example or Comparative Example was cut into dimensions of 60×60 mm, and subjected to stretch forming, with the aluminum foil's matt surface positioned outside, using a straight die for variable forming height with a forming height set at 3.0 mm. In the obtained 30 mm square tray, a heat-seal bar was applied at 190° C. for 3 seconds to sequentially the flange portions of the four sides such that the flange portions are brought into contact with the side wall portions. The appearance of near-boundary regions between the flange portions of sides and the side wall portions was observed, and evaluated as to whether or not lifting occurred between the oriented polyamide film and the aluminum foil. Two samples were prepared, and 8 sides in total were observed and evaluated with the following three-grade system.

Good: lifting does not occur (practically good)

Fair: lifting occurs in 1 to 4 sides among 8 sides (practically acceptable)

Poor: lifting occurs in 5 to 8 sides among 8 sides

<Wet-Heat Resistance>

A "1-ton desktop servo press (SBN-1000)" manufactured by YAMAOKA SEISAKUSHO CO., LTD. was used. The battery packaging material of Example or Comparative Example was cut into dimensions of 60×60 mm, and subjected to stretch forming, with the aluminum foil's matt surface positioned outside, using a straight die for variable forming height with a forming height set at 3.0 mm. The obtained 30 mm square tray was placed in a thermo-hygrostat having an atmosphere at 85° C. and 95% RH, and left to stand for 168 hours. The tray was taken out from the thermo-hygrostat. The appearance of near-boundary regions between the flange portions and the side wall portions was observed, and evaluated as to whether or not lifting occurred between the oriented polyamide film and the aluminum foil. Two samples were prepared, and 8 sides in total were observed and evaluated with the following three-grade system.

Good: lifting does not occur (practically good)
Fair: lifting occurs in 1 to 4 sides among 8 sides (practically acceptable)
Poor: lifting occurs in 5 to 8 sides among 8 sides The results are described in Table 1 to Table 4. Incidentally, in Example 3-1, during measurement of adhesion strength, the outer-layer-side substrate layer 1 was broken, and the accurate value was not determined.

TABLE 1

|  | Example | | | | | |
|---|---|---|---|---|---|---|
|  | 1-1 | 1-2 | 1-3 | 1-4 | 1-5 | 1-6 |
| Polyester polyol (A1-2) | 10 | | | | | |
| Polyester polyol (A1-3) | | 10 | | | | |
| Polyester polyol (A1-4) | | | 10 | | | |
| Polyester polyol (A1-5) | | | | 10 | | |
| Polyester polyol (A1-6) | | | | | 10 | |
| Polyester polyol (A1-7) | | | | | | 10 |
| KBM-403 | 0.07 | 0.07 | 0.07 | 0.07 | 0.05 | 0.05 |
| KW-75 | 2 | 2 | 2 | 2 | 1.5 | 1.5 |
| NCO equivalent ratio [NCO]/[OH] | 10.3 | 12.5 | 16.6 | 11.2 | 10.2 | 12.8 |
| Adhesion strength | 6.2 | 6.8 | 6.8 | 6.2 | 7.1 | 4.4 |
| Heat resistance | Good | Good | Good | Good | Good | Good |
| Wet-heat resistance | Fair | Fair | Good | Good | Good | Good |
| Formability 3.0 mm | Good | Good | Good | Good | Good | Good |
| 3.5 mm | Fair | Fair | Good | Good | Good | Good |

TABLE 2

|  | Example | | | | |
|---|---|---|---|---|---|
|  | 1-7 | 1-8 | 1-9 | 1-10 | 1-11 |
| Polyester polyol (A1-5) | 10 | 10 | 10 | 10 | 10 |
| KBM-403 | 0.06 | 0.06 | 0.06 | 0.06 | 0.06 |
| KW-75 | 0.7 | 1.4 | 2 | 2.5 | 3 |
| NCO equivalent ratio [NCO]/[OH] | 4.0 | 8.0 | 11.5 | 14.4 | 17.2 |
| Adhesion strength | 6.7 | 6.3 | 6.4 | 6.0 | 6.4 |
| Heat resistance | Fair | Good | Good | Good | Good |
| Wet-heat resistance | Fair | Good | Good | Good | Good |
| Formability 3.0 mm | Good | Good | Good | Good | Good |
| 3.5 mm | Good | Good | Good | Good | Good |

TABLE 3

|  | Example | | | | | | | |
|---|---|---|---|---|---|---|---|---|
|  | 2-1 | 2-2 | 2-3 | 2-4 | 2-5 | 2-6 | 3-1 | 3-2 |
| Polyester polyol (A2-2) | 10 | | | 10 | 10 | 10 | | |
| Polyester polyol (A2-3) | | 10 | | | | | | |
| Polyester polyol (A2-4) | | | 10 | | | | | |
| Polyester polyol (A3-1) | | | | | | | 10 | |
| Polyester polyol (A3-3) | | | | | | | | 10 |
| KBM-403 | 0.05 | 0.05 | 0.05 | 0.03 | 0.05 | 0.08 | 0.05 | 0.05 |
| YS POLYSTER K125 | | | | | | | | 0.27 |
| KW-75 | 1.63 | 1.63 | 1.63 | 1.94 | 1.94 | 1.94 | 2.7 | 1.8 |
| NCO equivalent ratio [NCO]/[OH] | 14.8 | 11.8 | 9.5 | 17.7 | 17.7 | 17.7 | 5.6 | 6.8 |
| Adhesion strength | 6.8 | 6.6 | 8.6 | 6.2 | 6.4 | 6.2 | 3.4(*) | 6.0 |
| Heat resistance | Good | Good | Fair | Good | Good | Good | Good | Fair |
| Wet-heat resistance | Good | Good | Fair | Good | Good | Good | Good | Fair |
| Formability 3.0 mm | Good | Good | Good | Good | Good | Good | Good | Good |
| 3.5 mm | Good | Good | Good | Fair | Good | Fair | Good | Good |

TABLE 4

|  | Comparative Example 1 |
|---|---|
| Polyester polyol (AH-1) | 10 |
| KBM-403 | 0.10 |
| KW-75 | 2.5 |
| NCO equivalent ratio [NCO]/[OH] | 11.2 |
| Adhesion strength | 6.6 |
| Heat resistance | Good |
| Wet-heat resistance | Poor |
| Formability 3.0 mm | Poor |
| 3.5 mm | Poor |

Example 4-1

To 100 parts of the polyester polyol A2-2, 0.5 parts of KBM-403 (silane coupling agent manufactured by Shin-Etsu Chemical Co., Ltd.; nonvolatile content: 100%) was added and sufficiently stirred until KBM-403 was completely dissolved. To this, 38.7 parts of KW-75 (polyisocyanate manufactured by DIC Corporation; nonvolatile content: 75%; NCO %: 13.3) and ethyl acetate were added such that the nonvolatile content became 25% and sufficiently stirred, to prepare an adhesive of Example 4-1.

Example 4-2 to Example 4-12

Adhesives of Example 4-2 to Example 4-12 were produced as in Example 4-1 except that the materials and compositions in Tables 5 and 6 were used.

Incidentally, the values in Tables 5 and 6 are based on solid content (or nonvolatile content).

The silane coupling agents used in Examples are specifically as follows (all are manufactured by Shin-Etsu Chemical Co., Ltd.).

KBM-403: 3-glycidoxypropyltrimethoxysilane
KBM-1003: vinyltrimethoxysilane
KBE-9007N: 3-isocyanatopropyltriethoxysilane
X-12-981S: polymer-type polyepoxysilane
KBM-303: 2-(3,4-epoxycyclohexyl)ethyltrimethoxysilane
KBM-402: 3-glycidoxypropylmethyldimethoxysilane
KBM-4803: glycidoxyoctyltrimethoxysilane The ketone resin used in Examples is as follows.
Variplus AP: ketone aldehyde condensation resin (manufactured by Evonik Industries)

As in Example 1-1, the battery packaging materials of Examples 4-1 to 4-2 were obtained using the adhesives of Example 4-1 to Example 4-12. The obtained battery packaging materials were evaluated in terms of formability as in Example 1-1 except that stretch forming was performed with forming heights being changed in a range of 3.0 mm to 5.0 mm as described below. The results are summarized in Tables 5 and 6.

TABLE 5

|  |  | Example | | | | | |
|---|---|---|---|---|---|---|---|
|  |  | 4-1 | 4-2 | 4-3 | 4-4 | 4-5 | 4-6 |
| Polyester polyol A2-2 |  | 100 | 100 | 100 |  |  |  |
| Polyester polyol A3-1 |  |  |  |  | 100 |  |  |
| Polyester polyol A3-2 |  |  |  |  |  | 100 |  |
| Polyester polyol A3-3 |  |  |  |  |  |  | 100 |
| KBM-403 |  | 0.5 | 1.0 | 1.0 | 0.5 | 1.0 | 1.0 |
| Ketone resin |  |  |  | 1.2 |  |  |  |
| KW-75 |  | 29.0 | 29.0 | 24.0 | 20.3 | 25.6 | 25.6 |
| NCO equivalent ratio [NCO]/[OH] |  | 17.6 | 17.6 | 14.6 | 2.8 | 6.0 | 6.3 |
| Formability | 3.0 mm | Good | Good | Good | Good | Good | Good |
|  | 3.5 mm | Fair | Good | Good | Good | Good | Good |
|  | 4.0 mm | Poor | Poor | Poor | Fair | Good | Good |
|  | 4.5 mm | Poor | Poor | Poor | Fair | Poor | Good |
|  | 5.0 mm | Poor | Poor | Poor | Fair | Poor | Poor |

TABLE 6

|  |  | Example | | | | | |
|---|---|---|---|---|---|---|---|
|  |  | 4-7 | 4-8 | 4-9 | 4-10 | 4-11 | 4-12 |
| Polyester polyol A2-2 |  |  |  |  |  |  | 100 |
| Polyester polyol A3-3 |  | 100 | 100 | 100 | 100 | 100 |  |
| KBE-9007N |  | 1.0 |  |  |  |  |  |
| X-12-981S |  |  | 1.0 |  |  |  |  |
| KBM-303 |  |  |  | 1.0 |  |  |  |
| KBM-402 |  |  |  |  | 1.0 |  |  |
| KBM-4803 |  |  |  |  |  | 1.0 |  |
| KW-75 |  | 25.7 | 25.7 | 25.7 | 25.7 | 25.7 | 29.0 |
| NCO equivalent ratio [NCO]/[OH] |  | 6.4 | 6.4 | 6.4 | 6.4 | 6.4 | 17.3 |
| Formability | 3.0 mm | Good | Good | Good | Good | Good | Good |
|  | 3.5 mm | Good | Good | Good | Good | Good | Poor |
|  | 4.0 mm | Good | Fair | Good | Good | Good | Poor |
|  | 4.5 mm | Poor | Poor | Fair | Good | Fair | Poor |
|  | 5.0 mm | Poor | Poor | Poor | Poor | Poor | Poor |

Example 5-1

To 100 parts of the polyester polyol (A2-2), 1 part of KBM-403 (silane coupling agent manufactured by Shin-Etsu Chemical Co., Ltd.; nonvolatile content: 100%) was added and sufficiently stirred until KBM-403 was completely dissolved. To this, 5.3 parts of HARITACK PH (stabilized rosin ester manufactured by Harima Chemicals Group, Inc.), 1.3 parts of Variplus AP (ketone aldehyde condensation resin manufactured by Evonik Industries), 23 parts of KW-75 (polyisocyanate manufactured by DIC Corporation; nonvolatile content: 75%; NCO %: 13.3), and ethyl acetate were added such that the nonvolatile content became 25% and sufficiently stirred, to prepare the battery packaging material adhesive of Example 5-1.

Example 5-2 to Example 5-6

The battery packaging material adhesives of Example 5-2 to Example 5-6 were produced as in Example 5-1 except that the materials and compositions in Table 7 were used.

Incidentally, the values in Table 7 are based on solid content (or nonvolatile content).

The tackifiers used in Examples and Reference Example are specifically as follows.

HARZTACK PH: stabilized rosin ester (manufactured by Harima Chemicals Group, Inc.)

HARITACK FK100: stabilized rosin ester (manufactured by Harima Chemicals Group, Inc.)

YS POLYSTER K125: terpene phenolic resin (manufactured by YASUHARA CHEMICAL CO., LTD.)

YS POLYSTER TH130: terpene phenolic resin (manufactured by YASUHARA CHEMICAL CO., LTD.)

YS POLYSTER T130: terpene phenolic resin (manufactured by YASUHARA CHEMICAL CO., LTD.)

As in Example 1-1, the battery packaging materials of Examples 5-1 to 5-6 were obtained using the adhesives of Example 5-1 to Example 5-6. The obtained battery packaging materials were evaluated for formability as in Example 4-1. The results are summarized in Table 7.

TABLE 7

|  |  | Example | | | | | |
|---|---|---|---|---|---|---|---|
|  |  | 5-1 | 5-2 | 5-3 | 5-4 | 5-5 | 5-6 |
| Polyester polyol A2-2 |  | 100 | 100 | 100 | 100 |  |  |
| Polyester polyol A3-1 |  |  |  |  |  | 100 | 100 |
| KBM-403 |  | 1.0 | 1.0 | 1.0 | 1.0 | 1.0 | 1.0 |
| HARITACK PH |  | 5.3 |  |  |  |  |  |
| HARITACK FK100 |  |  | 5.3 |  |  |  |  |
| YS POLYSTER TH130 |  |  |  | 5.3 |  |  |  |
| YS POLYSTER T130 |  |  |  |  | 5.3 |  |  |
| YS POLYSTER K125 |  |  |  |  |  | 5.4 |  |
| Ketone resin |  | 1.3 | 1.3 | 1.3 | 1.3 |  |  |
| KW-75 |  | 17.2 | 17.2 | 17.2 | 17.2 | 27.0 | 25.7 |
| NCO equivalent ratio [NCO]/[OH] |  | 10.4 | 10.4 | 10.4 | 10.4 | 10.4 | 6.4 |
| Formability | 3.0 mm | Good | Good | Good | Good | Good | Good |
|  | 3.5 mm | Good | Good | Good | Good | Good | Good |
|  | 4.0 mm | Good | Good | Good | Good | Good | Good |
|  | 4.5 mm | Poor | Poor | Poor | Poor | Good | Fair |
|  | 5.0 mm | Poor | Poor | Poor | Poor | Fair | Poor |

The results have demonstrated that use of battery packaging material adhesives according to the present invention provides battery packaging materials that have high formability and that do not undergo a decrease in the adhesion strength between layers or appearance defects such as lifting between layers even after thermal fusion between portions of the sealant layer performed for sealing battery elements and furthermore after a long-term durability test under high temperature and high humidity.

REFERENCE SIGNS LIST

1 outer-layer-side substrate layer
2 adhesive layer
3 metal layer
4 sealant layer
5 adhesive layer

The invention claimed is:

1. An adhesive for a packaging material comprising, as essential components, a polyol composition (A) a polyisocyanate composition (B), and a silane coupling agent,
  wherein the polyol composition (A) has a glass transition temperature from −30° C. or more, and 23.6° C. or less and includes a polyester polyol made from, as essential materials, a polybasic acid or its derivative and a polyhydric alcohol, the polybasic acid or its derivative material is all an aromatic-ring-containing polybasic acid or its derivative, and the polyester polyol has a number-average molecular weight in a range of 3000 to 100000, the content of the silane coupling agent relative to 100 parts by mass of the polyol composition (A) is 0.1 parts by mass or more and 10 parts by mass or less.

2. The adhesive according to claim 1, wherein the polyhydric alcohol material includes a branched alkylene diol.

3. The adhesive according to claim 2, wherein a content of the branched alkylene diol relative to 100 mol % of the polyhydric alcohol is 5 mol % or more and 95 mol % or less.

4. The adhesive according to claim 1, wherein the polyester polyol is made from, as essential materials, the polybasic acid or its derivative, the polyhydric alcohol, and a polyisocyanate.

5. The adhesive according to claim 1, wherein the polyester polyol is a reaction product of a polyisocyanate and an initial polyester polyol that is made from, as essential materials, the polybasic acid or its derivative and the polyhydric alcohol.

6. The adhesive according to claim 1, further comprising an adhesion promoter.

7. The adhesive according to claim 1, further comprising a tackifier.

8. A packaging material comprising at least an outer-layer-side substrate layer, an adhesive layer, a metal layer, and a sealant layer 4 that are stacked in this order, wherein the adhesive layer is a cured product of the adhesive according to claim 1.

9. A container provided by subjecting the packaging material according to claim 8 to forming.

10. A battery comprising the container according to claim 9.

11. A battery comprising the adhesive according to claim 1.

12. The adhesive according to claim 1, wherein the polyester polyol has a number-average molecular weight in a range of 3000 to 16,000.

* * * * *